United States Patent [19]

Enomoto et al.

[11] Patent Number: 5,568,962
[45] Date of Patent: Oct. 29, 1996

[54] BRAKING SYSTEM FOR MOTOR DRIVEN VEHICLE

[75] Inventors: Naoyasu Enomoto, Handa; Masamoto Ando, Toyota, both of Japan

[73] Assignee: Aisin Seiki Kabushiki Kaisha, Kariya, Japan

[21] Appl. No.: 489,736

[22] Filed: Jun. 13, 1995

[30] Foreign Application Priority Data

Jun. 14, 1994 [JP] Japan .................................. 6-132047

[51] Int. Cl.$^6$ ...................................................... B60L 7/22
[52] U.S. Cl. ............................................. 303/3; 303/152
[58] Field of Search ................................... 303/3, 15, 124, 303/152, 166, 113.1, 113.2, 113.3, 113.4, 116.1, 116.2, 119.1, 20, DIG. 1–4

[56] References Cited

U.S. PATENT DOCUMENTS

| | | | |
|---|---|---|---|
| 4,848,853 | 7/1989 | Mizuno et al. | 303/113.2 |
| 5,294,191 | 3/1994 | Giorgetti et al. | 303/152 X |
| 5,326,158 | 7/1994 | Ohori et al. | 303/3 |
| 5,472,264 | 12/1995 | Klein et al. | 303/20 X |

FOREIGN PATENT DOCUMENTS

| | | |
|---|---|---|
| 5-161210 | 6/1993 | Japan . |
| 5-161212 | 6/1993 | Japan . |
| 5-161213 | 6/1993 | Japan . |
| 5-161209 | 6/1993 | Japan . |
| 5-161211 | 6/1993 | Japan . |
| 5-176407 | 7/1993 | Japan . |

*Primary Examiner*—Josie Ballato
*Attorney, Agent, or Firm*—Sughrue, Mion, Zinn, Macpeak & Seas

[57] ABSTRACT

A braking system for an electromobile includes a relief valve VR2 for restricting a braking pressure to front wheel cylinders WC3, WC4, a bypass valve V5 connected in parallel to the relief valve VR2, a solenoid valve V1 interposed between the relief valve VR2 and booster HB and a solenoid valve V4 interposed between a pressure line 13 from the booster HB to the front wheel cylinders WC3, WC4 and a pressure line 12 from the booster HB to rear wheel cylinders WC1, WC2. During a regenerative braking by the use of an electric motor for driving front wheels WFL, WFR, a braking pressure is applied through the solenoid valve V1 and the relief valve VR2 to the wheel cylinders WC3, WC4. When the regenerative braking is interrupted, the solenoid valve V1 is closed and the bypass valve V5 and the solenoid valve V4 are opened.

4 Claims, 18 Drawing Sheets

BRAKING SYSTEM FOR MOTOR DRIVEN VEHICLE

FIELD OF THE INVENTION

The invention relates to a braking system as may be utilized in an electromobile, for example.

BACKGROUND OF THE INVENTION

Considering a usual electromobile, it will be noted that the power which is available for the running of the electromobile is only the power which is stored by a charged battery having a limited capacity. Accordingly, it is necessary to make an effective utilization of the available power on a vehicle in order to increase the distance which is permitted by a single charging operation. At this end, a regenerative braking is very effective means in an electromobile. Thus, during such braking operation, the kinetic energy of the vehicle is used to drive an electric motor which is connected to wheels of the vehicle, thus returning the power generated by the motor to the battery, and thus reducing a wasteful power dissipation.

However, the braking effort which is obtained by the regenerative braking is limited, and accordingly to supplement it when a braking effort in excess of that available by the regenerative braking is required, an oil pressure brake is used in combination with the regenerative braking.

In a general braking system for automobile, a distribution between a front wheel braking effort and a rear wheel braking effort is determined so that a response curve, commonly referred to as an ideal brake force distribution, can be approached as close as possible. However, for an electromobile, if a distribution of oil pressure brakes associated with driven wheels is chosen high, there results a reduced efficiency of power recovery by the regenerative braking.

To accommodate for this, there is proposed a special mode, referred to as regeneration preferential mode, which establishes a distribution between the front and the rear wheel braking effort, which is different from the ideal brake force distribution, in order to increase the efficiency of power recovery by the regenerative braking.

For example, Japanese Laid-Open Patent Application No. 161,210/1993 discloses a regeneration preferential mode in which only the regenerative braking is carried out by disabling all the oil pressure brakes in a region where the required braking effort remains relatively low. Also, Japanese Laid-Open Patent Application No. 161,212/1993 discloses an automatic control in which a regeneration preferential mode normally prevails while a conventional mode according to the ideal brake force distribution is entered when a wheel locking is detected as a result of reduced coefficients of friction presented by road surface. Additionally, Japanese Laid-Open Patent Application No. 161,213/1993 discloses an automatic switching between a regeneration preferential mode and a normal mode in accordance with the force with which a brake pedal is depressed or a rate of an increase in such force of depression.

When the oil pressure brakes are disabled during the regeneration preferential mode, on/off valves which are interposed in flow paths disposed between a master cylinder, which generates an oil pressure in accordance with a stroke of depression of a brake pedal, and wheel cylinders disposed adjacent to the individual wheels are closed. When the brake pedal is depressed to a degree while the on/off valves remain closed, the oil pressure from the master cylinder increases in accordance with the stroke of depression, but since the wheel cylinders are maintained at low oil pressures, a large pressure differential is developed therebetween. If the on/off valves are opened under such condition to switch from the regeneration preferential mode to the normal mode, the oil will instantly flow into the wheel cylinders through the on/off valves until the oil pressure in the wheel cylinders approach the oil pressure in the master cylinder. Accordingly, there occurs a temporary depression in the master cylinder pressure (M/C pressure) as shown in FIG. 6, and the stroke of the brake pedal will rapidly change and an oscillation is produced in the force which depresses the pedal, as indicated in FIGS. 8 and 10. This degrades a braking feeling experienced by a driver, and may increase the distance over which the vehicle must be braked.

SUMMARY OF THE INVENTION

It is a task of the invention to suppress a movement of the brake pedal toward a vehicle floor when switching on/off valves, which are interposed in flow paths extending between a master cylinder and wheel cylinders, from their closed to their open condition, thereby improving a braking feeling experienced by a driver and preventing the distance over which a vehicle must be braked from increasing.

The above task is solved in a first form of the invention by providing a braking system for motor driven vehicle comprising an onboard battery (1) for storing electric energy; an electric motor (M1) fed from the onboard battery for driving at least one of a first and a second wheel; regenerative braking means (D1–D6) responsive to the rotation of the first and/or the second wheel which is driven by the electric motor for returning the electric power generated by the motor to the onboard battery; first liquid pressure generating means (PL) for generating a braking liquid pressure in response to a depression of a brake pedal; second liquid pressure generating means (PH) for generating a power liquid pressure, which is substantially equal in liquid pressure to the brake liquid pressure generated by the first liquid pressure generating means, in accordance with a stroke of the brake pedal; first liquid pressure braking means (WC3, WC4) for applying a braking effort which corresponds to a given liquid pressure to the first wheel; second liquid pressure braking means (WC1, WC2) for applying a braking effort which corresponds to a given liquid pressure to the second wheel; first liquid pressure restricting means (VR2) interposed in a first liquid flow path (13) extending from the first liquid pressure generating means to the first liquid pressure braking means for restricting a liquid pressure which is supplied to the first liquid pressure braking means; first restriction terminate means (V5) for terminating the restriction upon the liquid pressure by the first liquid pressure restricting means; second liquid pressure restricting means (VR1) interposed in a second liquid flow path (12) extending from the second liquid pressure generating means to the second liquid pressure braking means for retricting the liquid pressure supplied to the second liquid pressure braking means; second restriction terminate means (V6) for terminating the restriction upon the liquid pressure by the second liquid pressure restricting means; first valve means (V1) interposed in the first liquid flow path extending between the first liquid pressure generating means and the first liquid pressure restricting means for opening or closing the liquid flow path; second valve means (V4) interposed in a third liquid flow path (CP) connecting between the first liquid flow path which extends between the first valve means and the first liquid pressure restricting means and the second liquid flow path which extends between the second liquid pressure generating means and the second liquid pressure restricting means; and switching control means (CPU 2) for controlling the first and the second restriction terminate means to terminate the restriction imposed by the first and the second liquid pressure restricting means whenever the operation of the regenerative braking means is to be interrupted and for interrupting the first valve means and opening the second valve means at least temporarily.

In a second form of the invention, a braking system for motor driven vehicle comprises an onboard battery (1) for storing electric energy; an electric motor (M1) fed from the onboard battery for driving at least one of a first and a second wheel; regenerative braking means (D1–D6) for returning the electric power to the onboard battery as it is generated by the motor as a result of the rotation of either the first and/or the second wheel as driven by the electric motor; a pump (PP) for pressurizing a braking liquid; a master cylinder (HB) including a piston (39) which moves in response to a depression of a brake pedal, a first pressure chamber (43) which is pressurized by the piston, a second pressure chamber (47), and pressure regulating means (44) for introducing a braking liquid which is pressurized by the pump in accordance with a stroke of the brake pedal into the second pressure chamber so that the pressure in the second pressure chamber becomes substantially equal to the pressure in the first pressure chamber; a first wheel cylinder (WC3, WC4) for applying a braking effort to the first wheel; a second wheel cylinder (WC1, WC2) for applying a braking effort to the second wheel; first liquid pressure restricting means (VR2) interposed in a first liquid flow path extending from the first pressure chamber to the first wheel cylinder for restricting the liquid pressure supplied to the first wheel cylinder; first restriction terminate valve means (V5) connected in parallel with the first liquid pressure restricting means for terminating the restriction applied by the first liquid pressure restricting means upon the liquid pressure; second liquid pressure restricting means (VR1) interposed in a second liquid flow path extending from the second pressure chamber to the second wheel cylinder for retricting the liquid pressure supplied to the second wheel cylinder; second restriction terminate valve means (V6) connected in parallel with the second liquid pressure restricting means for terminating the restriction applied by the second liquid, pressure restricting means upon the liquid pressure; first open/close valve means (V1) interposed in the first liquid flow path which extends between the first pressure chamber and the first liquid pressure restricting means for opening or closing the liquid flow path; second open/close valve means (V4) interposed in a third liquid flow path (CP) connecting between the first liquid flow path which extends between the first open/close valve means and the first liquid pressure restricting means and the second liquid flow path which extends between the second pressure chamber and the second liquid pressure restricting means; and switching control means (CPU 2) for controlling the first and the second restriction terminate valve means to terminate the restriction applied by the first and the second liquid pressure restricting means when the operation of the regenerative braking means is to be interrupted and for closing the first open/close valve means and opening the second open/close valve means at least temporarily.

In a third form of the invention, braking effort regulating means (VU) is connected in the first liquid flow path extending between the first liquid pressure restricting means and the first wheel cylinder to displace the braking liquid to a reservoir (RV1, RV2) of the master cylinder to regulate the liquid pressure in the first wheel cylinder.

In a fourth form of the invention, traction control means (171, 172, 173) is provided including third open/close valve means (V3) interposed in a fourth liquid flow path which connects between the second liquid flow path extending between the first open/close valve-means and the second liquid pressure restricting means and the output of the pump for opening or closing the liquid flow path, and fourth open/close valve means (V2) interposed in the second liquid flow path extending between the second liquid pressure restricting means and the second pressure chamber for opening or closing the liquid flow path. The traction control means closes the first open/close valve means, opens the second open/close valve means, opens the third open/close valve means and closes the fourth open/close valve means whenever a given condition which requires a traction control is satisfied, thus controlling the braking effort regulating means to control the braking effort applied to the wheel.

It should be understood that numerals and reference characters appearing in parentheses in the above description designate corresponding elements or components appearing in an embodiment to be described later, but that the components and elements used to construct the invention are not limited to specific elements or components shown in the embodiment.

In the first form of the invention, the first liquid pressure generating means (PL) and the second liquid pressure generating means (PH) are provided as a source of liquid pressure. The first liquid pressure generating means produces a braking liquid pressure in response to a depression of the brake pedal, and the second liquid pressure generating means generates a power liquid pressure which is substantially equal in liquid pressure to the braking liquid pressure generated by the first liquid pressure generating means in accordance with a stroke of the brake pedal.

Normally, or when the regenerative braking is to be performed, the liquid pressure which is output from the first liquid pressure generating means is applied to the first liquid pressure braking means (WC3, WC4) through the first valve means (V1) and the first liquid pressure restricting means (VR2), and the liquid pressure which is output from the second liquid pressure generating means is applied to the second liquid pressure braking means (WC1, WC2) through the second liquid pressure restricting means (VR1). Accordingly, the braking effort which is effected by the liquid pressure will be reduced by an amount corresponding to the restriction imposed upon the pressure as applied by the first and the second liquid pressure restricting means, and the regenerative braking compensates for such amount of reduction. In this manner, the regenerative braking is preferentially applied, reducing a power loss.

On the other hand, when a liquid pressure braking is to be preferentially applied in order to bring the distribution of braking efforts to the front and the rear wheel close to the ideal braking force distribution or when the regenerative braking means fails, the operation of the regenerative braking means is interrupted. To compensate for a reduction in the braking effort which results, the first and the second restriction terminate means (V5, V6) are controlled to terminate the restriction applied on the liquid pressure thereby. When such mode switching takes place, the switching control means (CPU) of the invention closes the first valve means (V1) and opens the second valve means (V4).

Accordingly, at this time, the first liquid pressure generating means and the first liquid pressure braking means (WC3, WC4) are interrupted by the first valve means (V1), and the power liquid pressure which is output from the second liquid pressure generating means is applied to the first liquid pressure braking means (WC3, WC4) through the second valve means (V4).

In the mode in which the regenerative braking is to be preferentially applied, the first liquid pressure restricting means creates a pressure differential between the first liquid pressure generating means and the first liquid pressure braking means, and similarly, the second liquid pressure restricting means creates a pressure differential between the second liquid pressure generating means and the second liquid pressure braking means. Accordingly, when the restriction applied by the first and the second liquid pressure restricting means is terminated in order to switch the mode, the driving fluid will flow freely into the first and the second liquid pressure restricting means until such pressure differentials are removed. Since the first liquid pressure generating means generates a normal braking liquid pressure in response to a depression of the brake pedal, it follows that if the first valve means (V1) is left open and the second valve means remains closed as in the prior art, the liquid pressure from the first liquid pressure generating means will be depressed temporarily as indicated by M/C pressure curve shown in FIG. 6, and the stroke of the brake pedal will change rapidly and an oscillation will occur in the force upon the pedal, as indicated in FIGS. 8 and 10. This degrades the brake feeling, and may increase the distance over which the vehicle must be braked.

However, in accordance with the invention, when the restriction applied by the first and the second liquid pressure restricting means is terminated, the power liquid pressure which is output from the second liquid pressure generating means is applied to the first and the second liquid pressure braking means. Such power liquid pressure is separate from the braking liquid pressure which is produced in response to the depression of the brake pedal, and hence is not likely to be subject to a depression in the liquid pressure. In addition, if a depression in the liquid pressure occurs, it does not have an adverse influence upon the stroke of the brake pedal. Accordingly, any change in the stroke of the brake pedal is suppressed, improving the brake feeling.

According to the second form of the invention, the arrangement employs a master cylinder (HP) including a hydraulic booster, suppressing any change in the stroke of the brake pedal upon the mode switching in the same manner as described above in connection with the first form of the invention. Specifically, the master cylinder (HP) includes a piston (39) which moves in response to the depression of the brake pedal, a first pressure chamber (43) which is pressurized by the piston, a second pressure chamber (47), and pressure regulating means (44) for introducing a braking liquid which is pressurized by a pump (PP) in accordance with the stroke of the brake pedal into the second pressure chamber until the pressure in the second pressure chamber is regulated substantially equal to the pressure in the first pressure chamber. In this manner, the first and the second pressure chamber correspond to the first and the second liquid pressure generating means (PL, PH), respectively. The pressure which is output from the second pressure chamber is obtained by regulating the output pressure from the pump (PP), and hence is little subject to a fluctuation in the pressure, which is small if the load rapidly changes. If a fluctuation in the pressure occurs, it has no influence upon the stroke of the brake pedal.

According to the third form of the invention, braking effort regulating means (VU) is connected in the first liquid flow path extending between the first liquid pressure restricting means and the first wheel cylinder for displacing the braking liquid into a reservoir (RV1, RV2) of the master cylinder to regulate the liquid pressure in the wheel cylinder. Accordingly, if the depression of the brake pedal remains constant, the liquid pressure in the first wheel cylinder can be regulated by controlling the braking effort regulating means (VU). Thus, ABS (anti-lock brake system) can be realized. When performing the ABS by controlling the braking effort regulating means (VU), there occurs a rapid change in the load of the master cylinder, whereby a fluctuation occurs in the amount of depression of the brake pedal. However, even at this time, the first open/close valve means is closed while the second open/close valve means is opened to supply the pressure (dynamic pressure) in the second pressure chamber to the load, thus preventing a change in a stroke of depression of the brake pedal from occurring.

According to the fourth form of the invention, the third open/close valve means (V3) is interposed in the fourth liquid flow path which connects between the second liquid flow path extending between the first open/close valve means and the second liquid pressure restricting means and the output of the pump, and the fourth open/close valve means (V2) is interposed in the second liquid flow path extending between the second liquid pressure restricting means and the second pressure chamber. When a given condition which requires a traction control is satisfied, the traction control means (171, 172, 173) closes the first open/close valve means, opens the second open/close valve means, opens the third open/close valve means, and closes the fourth open/close valve means, thus controlling the braking effort regulating means to exercise a control over the braking effort of the wheel. Specifically, when a slip rate of a wheel is excessively high as when starting a vehicle, a coefficient of friction acting between the wheel and the road surface is reduced to reduce the driving force. Accordingly, by applying a braking to the rotation of the wheel to reduce the slip rate, the driving efficiency can be improved. When the third open/close valve means is opened, the liquid pressure can be supplied to the first wheel cylinder (WC3, WC4) to apply a braking to the rotation of the wheel, without depression of the brake pedal. Since the fourth open/close valve means is closed at this time, the pressure which is supplied from the pump through the third valve means has no influence upon the stroke of the brake pedal which is connected to the master cylinder.

Other objects and features of the invention will become apparent from the following description of several embodiments thereof.

DETAILED DESCRIPTION OF PREFERRED EMBODIMENTS

Figure 1:
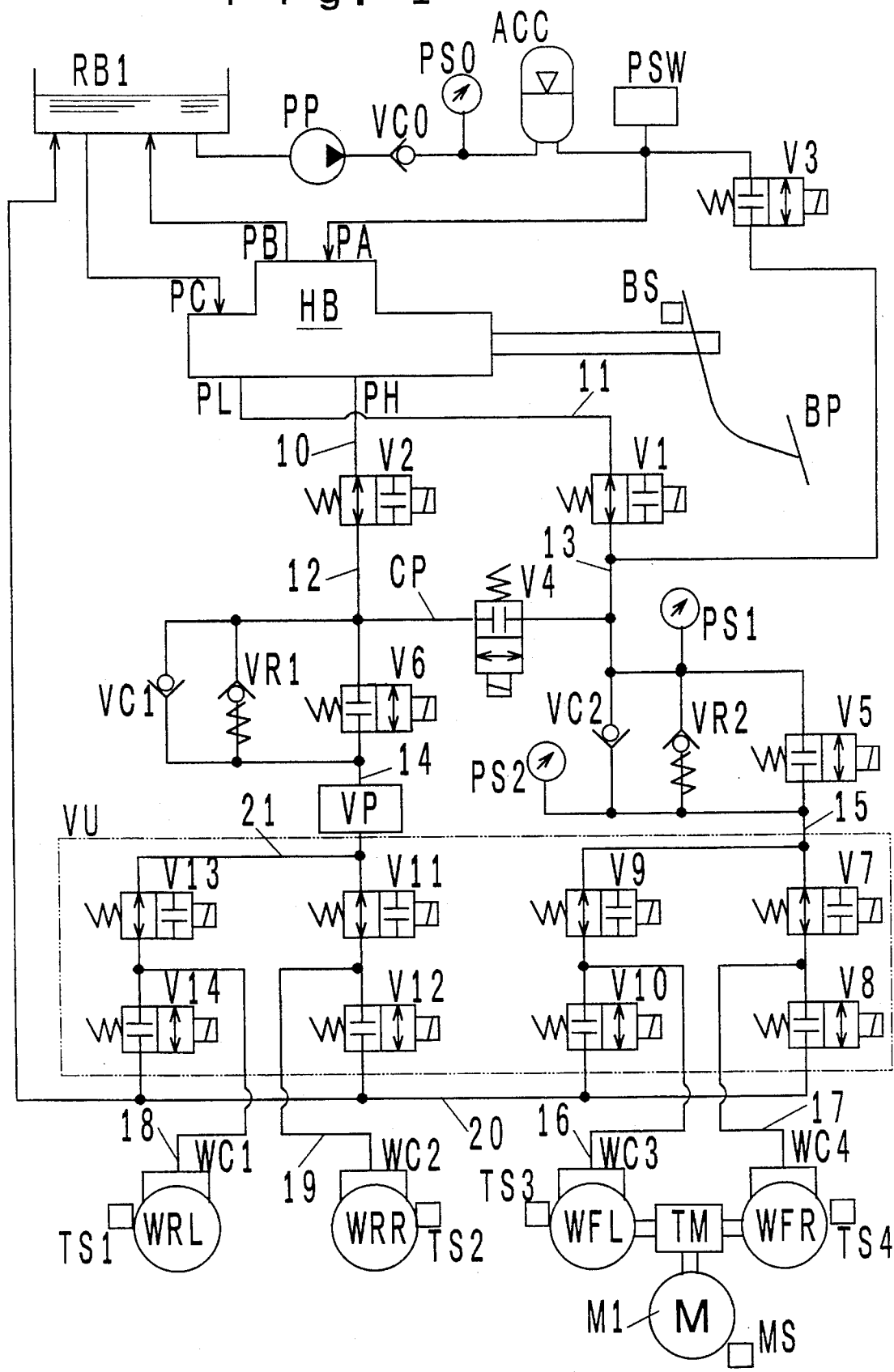
FIG. 1 is a block diagram of an oil pressure system for a brake system of an electromobile according to an embodiment of the invention.

An essential construction of a driving system and a control system for an electromobile in accordance with one embodiment of the invention is shown in FIG. 1. Referring to FIG. 1, in this embodiment, the electromobile includes four wheels WFL, WFR, WRL and WRR, of which the front wheels WFL and WFR represent driving wheels while the rear wheels WRL and WRR represent driven wheels. An electric motor M1, acting as a driving source, includes a driving shaft which is connected through a transmission TM to the axles of the front wheels WFL and WFR. Wheel cylinders WC3, WC4, WC1 and WC2 which are used for the oil pressure braking are mounted adjacent to the respective wheels. Since the front wheels WFL and WFR are driving wheels, a regenerative braking by the motor M1 is enabled.

Wheel speed sensors TS3, TS4, TS1 and TS2 are provided adjacent to the wheels WFL, WFR, WRL and WRR, respectively, for detecting the rotational speed of the respective wheels. A motor speed sensor MS is disposed adjacent to the driving shaft of the motor M1 for detecting its rotational speed. These sensors TS3, TS4, TS1, TS2 and MS deliver a pulse signal having a period which depends on the rotational speed.

Describing an oil pressure system shown in FIG. 1, a hydraulic booster HB is used to generate a braking oil pressure in this embodiment. The booster HB delivers a first oil pressure (static pressure) which depends on the stroke of depression of brake pedal BP, and a second oil pressure (dynamic pressure) which is substantially equal to the first oil pressure at outlet ports PL and PH, respectively. The static pressure obtained at the outlet port PL is similar to an output pressure from a usual brake master cylinder, and the dynamic pressure obtained at the outlet port PH is formed by regulating a power pressure produced by a pump PP. The construction and the operation of the hydraulic booster HB will be again described later.

The booster HB has ports PB and PC connected to a reservoir RB1, and also has a port PA which is connected to a flow path in which the power pressure is generated by the pump PP. The output pressure from the pump PP is fed through a check valve VC0 to be accumulated in an accumulator ACC to be supplied to the port PA. The pump PP is driven by an electric motor, not shown. A pressure switch PSW is provided in order to maintain the power pressure in a given range. Specifically, the power switch PSW delivers a signal which turns on or off the motor, thus controlling the pump PP. A pressure sensor PS0 is connected to the output of the pump PP. The output from the accumulator ACC is connected through a solenoid valve V3 to a piping 13. The solenoid valve V3 is normally closed, but is opened only when a traction control is effected.

The dynamic pressure appearing at the port PH of the booster HB is passed through a piping 10 and through a solenoid valve V2 to be fed to a piping 12. The static pressure appearing at the port PL of the booster HB is passed through a piping 11 and through a solenoid valve V1 to be fed to a piping 13. The pipings 12 and 13 are connected to each other through a piping CP in which a solenoid valve V4 is disposed.

A circuit including a relief valve (also referred to as a differential pressure valve) VR2, a check valve VC2 and a bypass valve V5 connected in parallel to each other is interposed between the piping 13 and a piping 15 associated with the front wheels. Similarly, a circuit including a relief valve VR1, a check valve VC1 and a bypass valve V6 connected in parallel to each other is interposed between the piping 12 and a piping 14 associated with the rear wheels.

The relief valve VR1 opens when an oil pressure in the piping 12 is by a given value or more higher than the oil pressure in the piping 14, thus mechanically controlling a pressure differential between the pipings 12 and 14 constant. The check valve VC1 is normally closed, but is opened whenever the oil pressure in the piping 14 rises above the oil pressure in the piping 12 for some reason, thus releasing the oil pressure from the piping 14 to the piping 12. The bypass valve V6 is a solenoid valve, which is normally closed, but is controlled to be open whenever a failure occurs in an electrical system, causing the oil pressures in the pipings 12 and 14 to be equal to each other.

Similarly, the relief valve VR2 opens whenever the oil pressure in the piping 13 is by a given value or more higher than the oil pressure in the piping 15, thus mechanically controlling the pressure differential between the pipings 13 and 15 constant. The check valve VC2 is normally closed, but becomes open whenever the oil pressure in the piping 15 rises above the oil pressure in the piping 13 for some reason, thus releasing the oil pressure from the piping 15 to the piping 13. The bypass valve V5 is a solenoid valve, which is normally closed, but is controlled to be open mechanically when a failure occurs in an electrical system, causing the oil pressures in the pipings 13 and 15 to be equal to each other.

Pressure sensors PS1 and PS2 are disposed in the pipings 13 and 15, respectively, and a proportioning valve VP is connected in the piping 14 and is also connected to a piping 21.

The piping 15 is connected to wheel cylinders WC3 and WC4 through a valve unit VU, while the piping 21 is connected to the wheel cylinders WC1 and WC2 through the valve unit VU. The purpose of the valve unit VU is to enable ABS (anti-lock brake system) and a traction control, and includes eight solenoid valves V7, V8, V9, V10, V11, V12, V13 and V14.

The piping 15 is connected through the solenoid valve V7 and a piping 17 to the wheel cylinder WC4, and the piping 17 is connected through the solenoid valve V8 and a piping 20 to the reservoir RB1. Accordingly, the oil pressure of the wheel cylinder WC4 can be intensified by opening the solenoid valve V7, and the oil pressure of the wheel cylinder WC4 can be decompressed by opening the solenoid valve V8.

Similarly, the piping 15 is connected through the solenoid valve V9 and a piping 16 to the wheel cylinder WC3, and the piping 16 is connected through the solenoid valve V10 and the piping 20 to the reservoir RB1. The piping 21 is connected through a solenoid valve V11 and a piping 19 to the wheel cylinder WC2 while the piping 19 is connected through the solenoid valve V12 and the piping 20 to the reservoir RB1. The piping 21 is also connected through the solenoid valve V13 and a piping 18 to the wheel cylinder WC1 while the piping 18 is connected through the solenoid valve V14 and the piping 20 to the reservoir RB1.

Accordingly, the oil pressure of the wheel cylinder WC4 can be adjusted by controlling the solenoid valves V7 and V8; the oil pressure of the wheel cylinder WC3 can be adjusted by controlling the solenoid valves V9 and V10; the oil pressure of the wheel cylinder WC2 can be adjusted by controlling the solenoid valves V11 and V12; and the oil pressure of the wheel cylinder WC1 can be adjusted by controlling the solenoid valves V13 and V14.

The proportioning valve VP operates in a manner such that whenever the oil pressure at the inlet to the piping 14 is equal to or below a given value, it makes the oil pressure in the piping 21 associated with the rear wheel cylinders to be equal to the oil pressure at this inlet while whenever the oil pressure at the inlet exceeds said given value, it isolates the outlet from the inlet so that a rate of change in the outlet oil pressure relative to a change in the inlet oil pressure be suppressed than before. The provision of the proportioning valve VP enables a braking force distribution across the front and the rear wheel to be broken line response as indicated in solid, dotted and phantom lines in FIG. 16, for example, so as to be close to an ideal distribution through the oil pressure braking.

It is to be noted that a brake switch BS is disposed adjacent to a brake pedal BP in order to detect an on/off condition of each depression.

Figure 2:
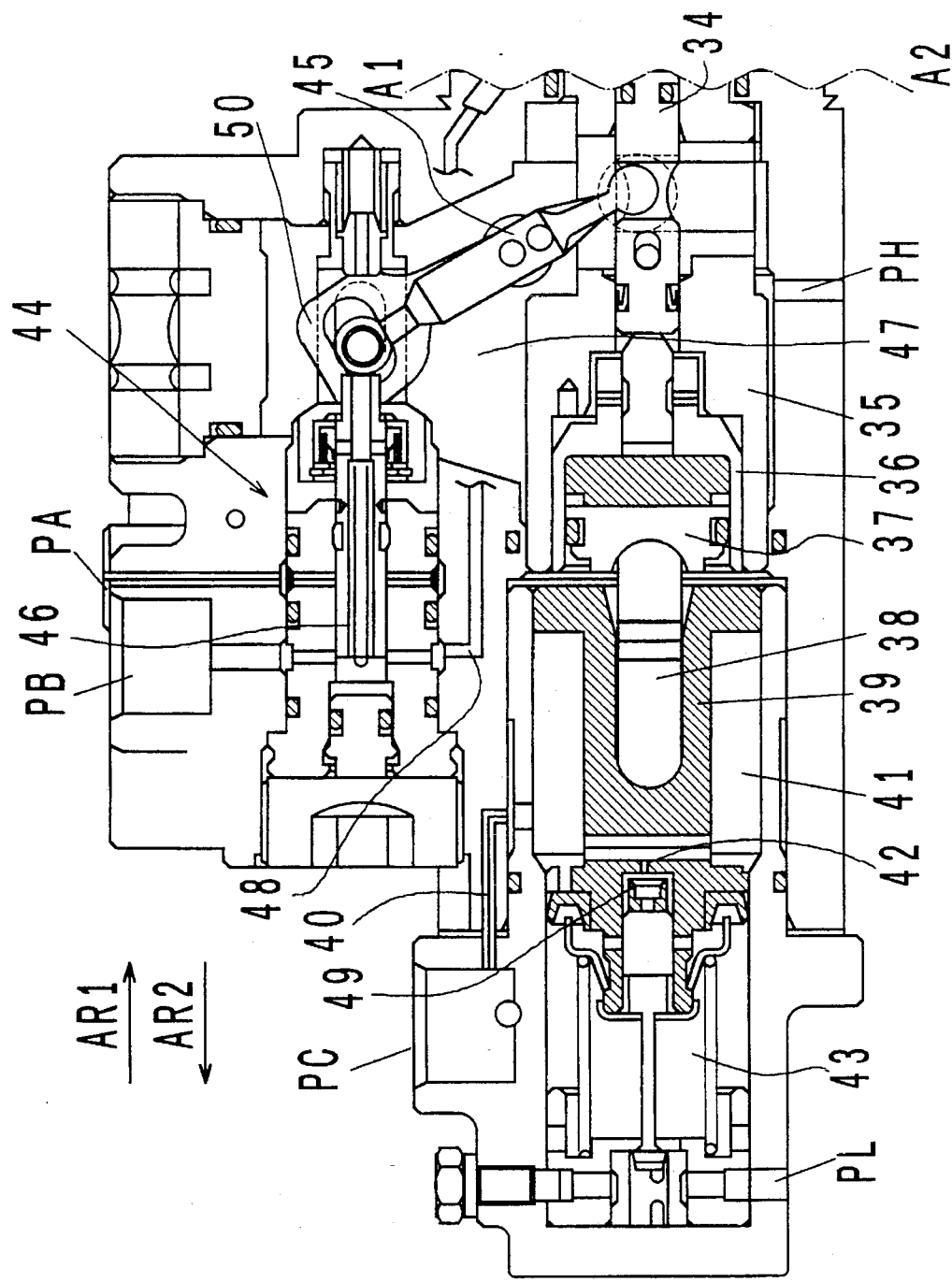
FIG. 2 is a longitudinal section of part of a hydraulic booster HB shown in FIG. 1.
Figure 3:
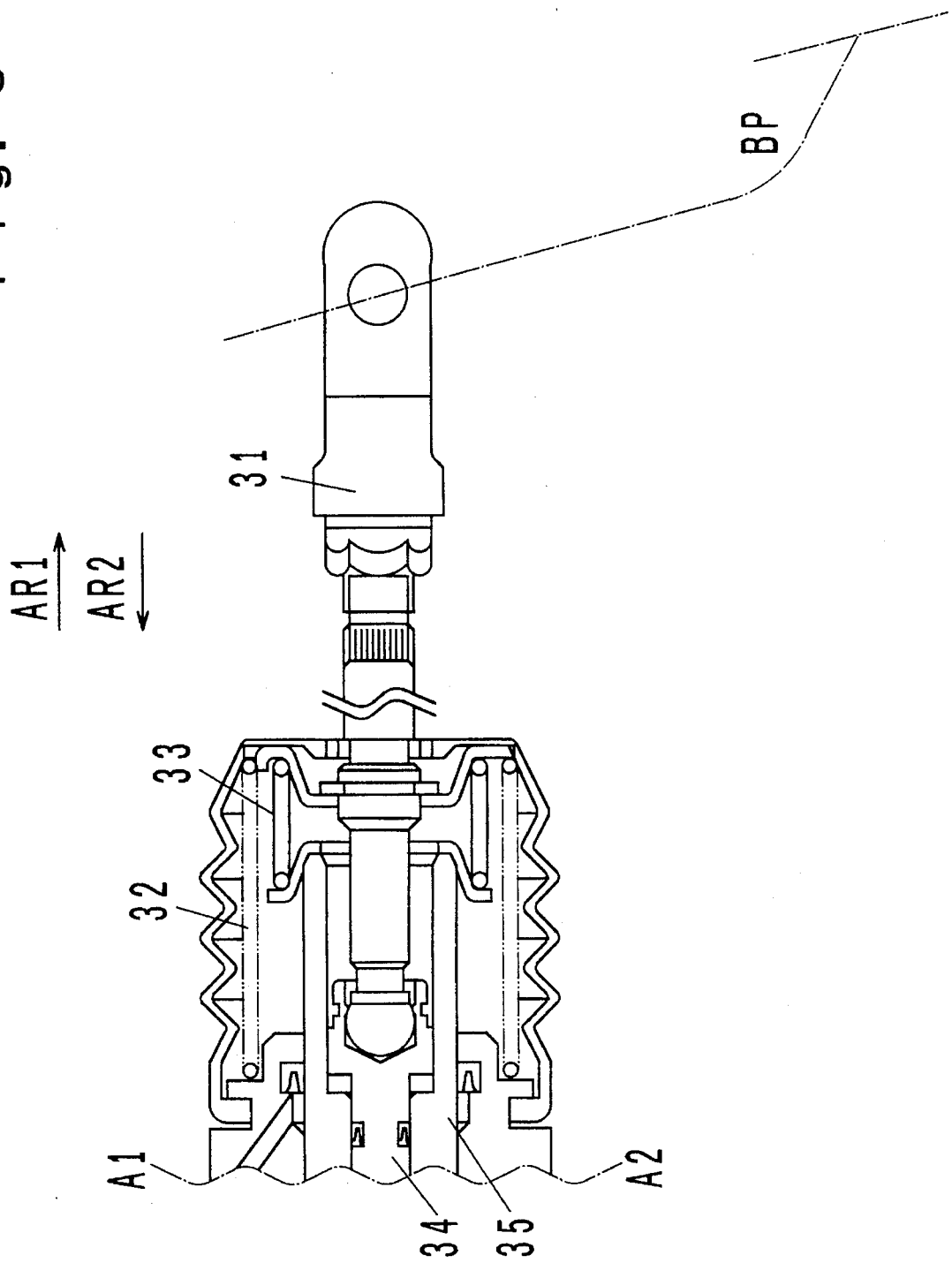
FIG. 3 is a longitudinal section of the remaining portion of the hydraulic booster HB shown in FIG. 1.

The specific construction of the hydraulic booster HB shown in FIG. 1 is indicated in more detail in split form in FIGS. 2 and 3. It is to be understood that the construction and the principle of operation of the booster HB is fundamentally the same as in a known hydraulic booster.

In the absence of depression of the brake pedal BP, a rod 31 which is connected thereto is displaced in a direction indicated by an arrow AR1 by the resilience of coiled compression springs 32 and 33. Accordingly, a push rod 34, pistons 35, 36, 37, rod 38 and piston 39 remain at rest at its limit positions reached in the direction of the arrow AR1. Under this condition, an oil introduced through the port PC from the reservoir RB1 passes through a flow path 40, an internal cylinder space 41, an opening 42 and a space 43 to the port PL, which then assumes an oil pressure of substantially zero.

Also, in the absence of depression of the brake pedal BP, a lever 45 remains at rest at its limit position reached in the direction of the arrow AR1, and accordingly a tubular piston 46 of a spool valve 44 is also located at its limit position reached in the direction AR1, as shown. At this time, a space 47 connected to the port PH is connected through a flow path 48 and the spool valve 44 to the port PB while the port PA is interrupted by the spool valve 44, whereby the oil pressure at the port PH assumes the same value (zero) as the reservoir RB1.

On the other hand, when the brake pedal BP is depressed, the rod 31, push rod 34, pistons 35, 36, 37, rod 38 and piston 39 are driven in a direction indicated by an arrow AR2 in accordance with the stroke of depression. As the piston 39 moves in the direction of the arrow AR2, a seal member 49 closes the opening 42, thus interrupting the flow path between the port PC and the port PL. Accordingly, the oil pressure in the port PL rises substantially in proportion to the travel of the piston 39 or the stroke of depression of the brake pedal BP.

Also, as the push rod 34 moves in the direction of the arrow AR2 in response to the depression of the brake pedal BP, the lever 45 is also displaced in the direction of the arrow AR2, accompanying a movement of the piston 46 of the spool valve 44 in the direction AR2. This allows the power pressure applied to the port PA to be introduced into the space 47 through the spool valve 44. However, when the pressure in the space 47 rises above the static pressure in the space 43, a member 50 mounted on the lever 45 pushes back the piston 46 in the direction of the arrow AR1, interrupting the introduction of the power pressure into the space 47. Subsequently, when the pressure in the space 47 falls below the static pressure in the space 43, the piston 46 ceases to move in the direction of the arrow AR1, whereby the introduction of the power pressure into the space 47 is resumed. In other words, an automatic control takes place such that the pressure (dynamic pressure) in the space 47 substantially matches the static pressure in the space 43.

The pressure in the space 47 causes the piston 35 to drive the piston 39 in the direction of the arrow AR2, whereby the piston 39 which generates a braking pressure in the space 43 is influenced by both the power pressure which drives the piston 35 and the force with which the brake pedal is depressed to move the piston 37. In other words, a servo ratio is created in accordance with the ratio of areas of respective end faces of the outer piston 35 and the inner pistons 36, 37, which are coaxially disposed, in opposing relationship with the piston 39, producing a greater force than the force of depressing the brake pedal which is applied to the piston 39, thus reducing the force required to depress the brake pedal in order to generate a braking pressure.

Since the dynamic pressure appearing at the port PH is automatically adjusted within the hydraulic booster HB so that it matches the braking pressure at the port PL, there is substantially little change in the pressure at the Fort PH if there is a rapid change in the load on the port PH, that is, the amount of oil dissipated. A change in the amount of oil dissipated relative to the port PH has no influence upon the positions of the piston 35 and the push rod 34, thus avoiding any change from occurring in the stroke of depression of the brake pedal BP in response to any change in these positions.

Considering an electrical system used, the motor M1 used in this embodiment comprises an induction motor including a rotor on which magnetic poles are formed by permanent magnets and a stator carrying a three phase winding. When an alternating power is applied to the three phase winding on the stator, a rotating magnetic field is produced, thus driving the rotor for rotation. When the rotor of the motor M1 is driven for rotation as a result of the rotation of the wheels, a braking effect can be applied by generating a magnetic field in the stator winding which acts in the direction to stop such rotation and the electromotive force generated in the stator winding can be recovered to a power supply, thus realizing a regenerative braking. The motor M1 internally contains a detector which detects the position of magnetic poles on the rotor.

Figure 4:
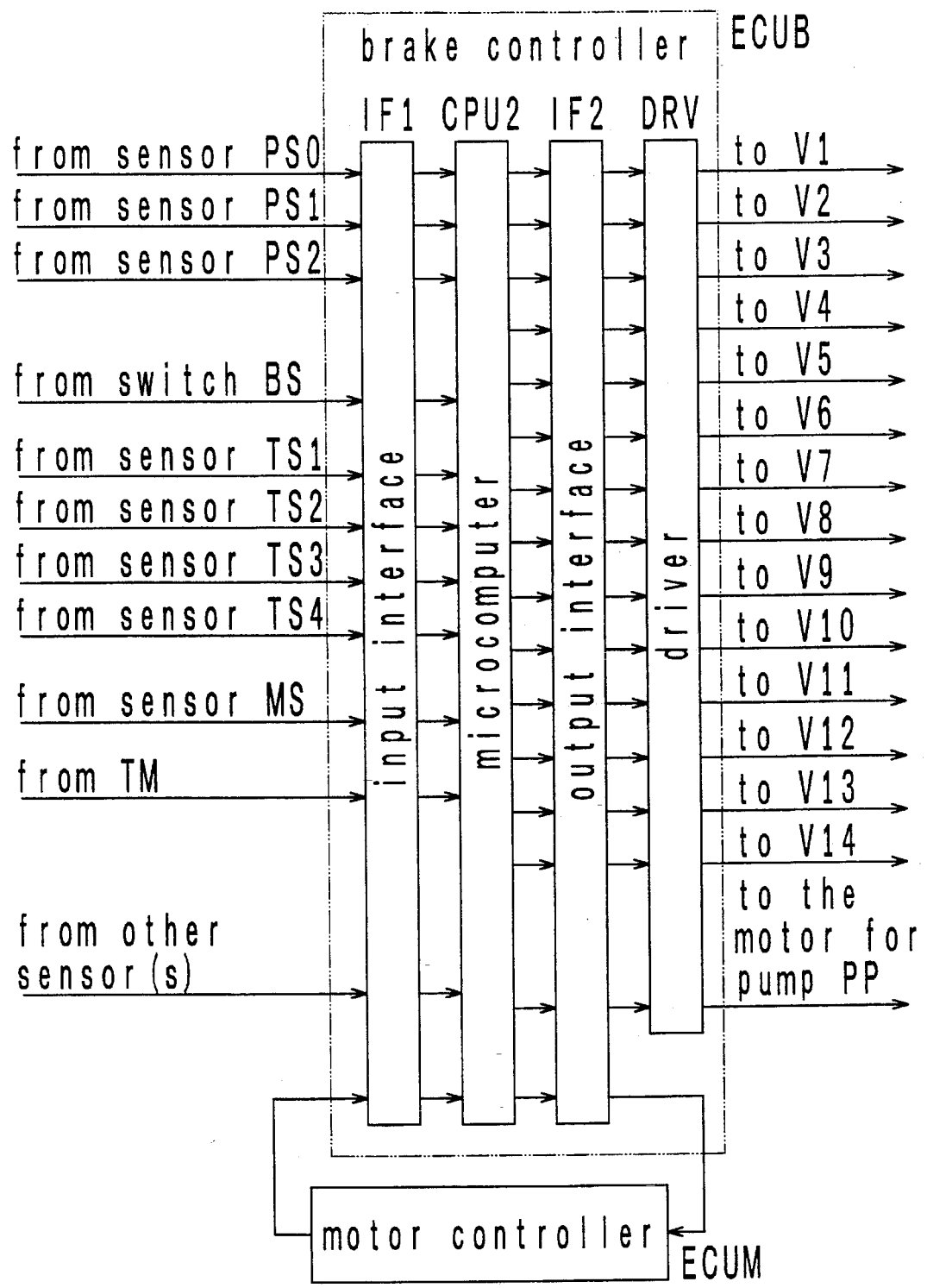
FIG. 4 is a block diagram illustrating the essential arrangement of an electrical arrangement of the system shown in FIG. 1.

As shown in FIG. 4, in this embodiment, an electrical circuit which controls the motor M1 includes a motor controller ECUM and a brake controller ECUB. The motor controller ECUM mechanically controls the driving of the motor M1 while the brake controller ECUB controls the oil pressure braking and the regenerative braking.

Referring to FIG. 4, the brake controller ECUB includes a microcomputer CPU2, an input interface IF1 and an output interface IF2 and a driver DRV. The microcomputer CPU has input ports, to which pressure sensors PS0, PS1, PS2, brake switch BS, wheel speed sensors TS1, TS2, TS3, TS4, motor speed sensor MS, all shown in FIG. 1, as well as a transmission TM and the motor controller ECUM are connected through the input interface IF1. The solenoid valves V1 to V14 and the motor associated with the pump PP shown in FIG. 1 are connected to output ports of the microcomputer CPU2 through the driver DRV and the output interface IF2. To permit a data communication between the brake controller ECUB and the motor controller ECUM, the input and the output ports of the microcomputer CPU2 are connected to a microcomputer in the motor controller ECUM.

Figure 5:
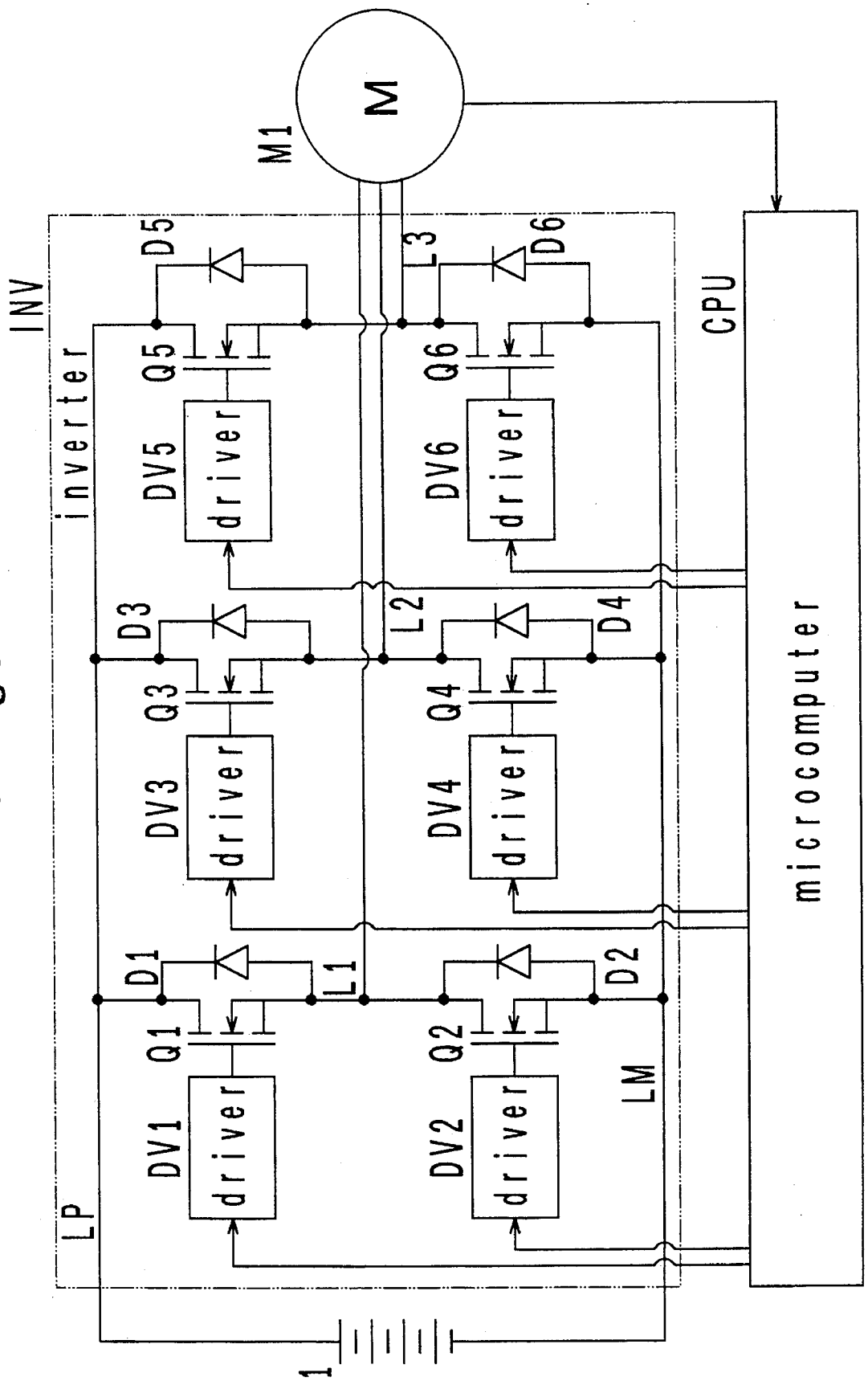
FIG. 5 is a block diagram of a motor controller ECUM.
Figure 6:
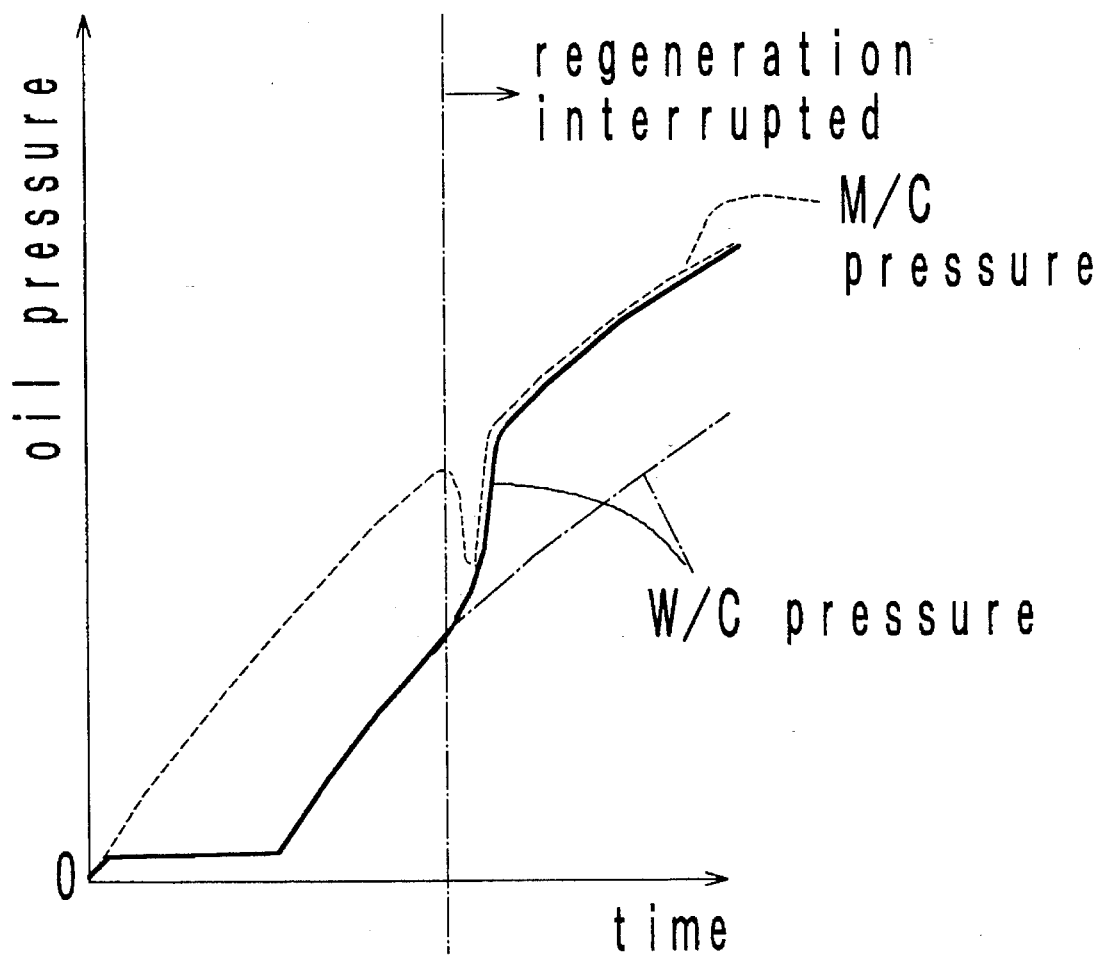
FIG. 6 graphically shows a change in the M/C pressure and W/C pressure with time in a conventional arrangement.

A major portion of the motor controller ECUM is shown in FIG. 5. Referring to FIG. 5, the motor controller ECUM includes an inverter INV having three output lines L1, L2 and L3, which are connected to the respective phase windings of the motor M1. Bus lines LP and LM of the inverter INV are connected to the positive and the negative terminal of the onboard battery 1. In the embodiment, a lead battery is used as the onboard battery, but a high capacity condenser or a sub-battery may be connected in parallel with the lead battery.

The inverter INV includes six switching output transistors Q1, Q2, Q3, Q4, Q5 and Q6. By turning on at least one of transistors Q1, Q3 and Q5 in the upper bank and at least one of transistors Q2, Q4 and Q6 in the lower bank, a current can be fed to the respective windings of the motor 2 from the battery 1. However, pairs of transistors Q1 and Q2, Q3 and Q4 and Q5 and Q6 cannot be simultaneously turned on.

Transistors Q1, Q2, Q3, Q4, Q5 and Q6 have control terminals, which are connected to the outputs of drivers DV1, DV2, DV3, DV4, DV5 and DV6, respectively. These drivers DV1 to DV6 have input terminals which are connected to output ports of a microcomputer CPU. In this manner, the microcomputer CPU controls the energization of the windings of the motor M1 by selectively turning on and off the transistors Q1 to Q6.

To enable a continuous rotation of the motor M1, it is necessary to displace the location of the respective magnetic poles defined by the stator winding sequentially in correspondence to the location of the magnetic poles on the rotor and in a direction to drive the rotor. Accordingly, the microcomputer CPU determines the timing of control signals applied to the drivers DV1 to DV6 on the basis of a signal from a position detector which is internally housed within the motor M1.

It is also possible to apply a braking action to the rotation of the motor M1 by adjusting the timing of control signals applied to the drivers DV1 to DV6. During such braking operation, the motor M1 functions as a generator, inducing an electric power in the stator winding thereof, which can be recovered to the battery 1.

Specifically, when the voltage on the output line L1 rises above the voltage level of the bus line LP as a result of the electromotive force being generated in the stator winding, there occurs a current flow from the output line L1 to the bus line LP through the diode D1. Conversely, when the voltage on the output line L1 falls below the voltage level of the bus line LM, there occurs a current flow from the output line L1 to the bus line LM through a diode D2, thus charging the battery 1. Similarly, when the voltage level on the output line L2 rises above the bus line LP, a current flow occurs from the output line L2 to the bus line LP through a diode D3, and when the voltage level on the output line L2 falls below the bus line LM, a current flow occurs from the output line L2 to the bus line LM through a diode D4, again charging the battery 1. Finally, when the voltage level on the output line L3 rises above the bus line LP, a current flow occurs from the output line L3 to the bus line LP through a diode D5, and when the voltage level on the output line L3 falls below the bus line LM, a current flow occurs from the output line L3 to the bus line LM through a diode D6, thus charging the battery 1.

Motor controller ECUM control the drive (rotational speed) of the motor M1 in accordance with an output signal of a potentiometer, not shown, which detects a stroke of depression of the brake pedal. When commanding the brake controller ECUB to implement the renegerative braking, the motor M1 is braked to a degree which is determined by the command. The driving torque and the braking torque applied to the motor M1 are adjusted by controlling the pulse width of signals applied to the control terminals of the transistors Q1–Q6 in the inverter INV.

Figure 14:
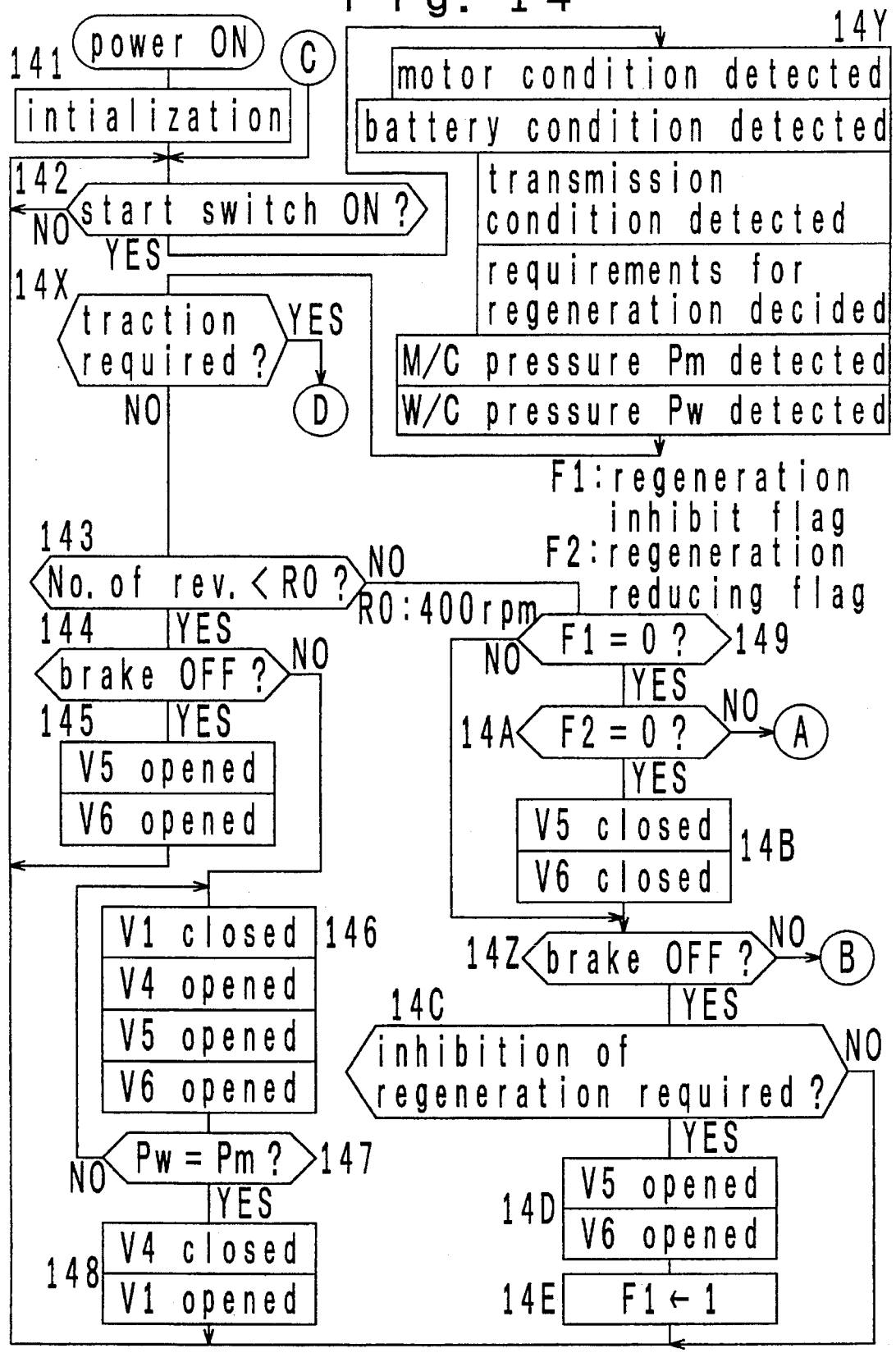
FIG. 14 is a flow chart showing part of the operation of a microcomputer CPU 2 shown in FIG. 4.
Figure 15:
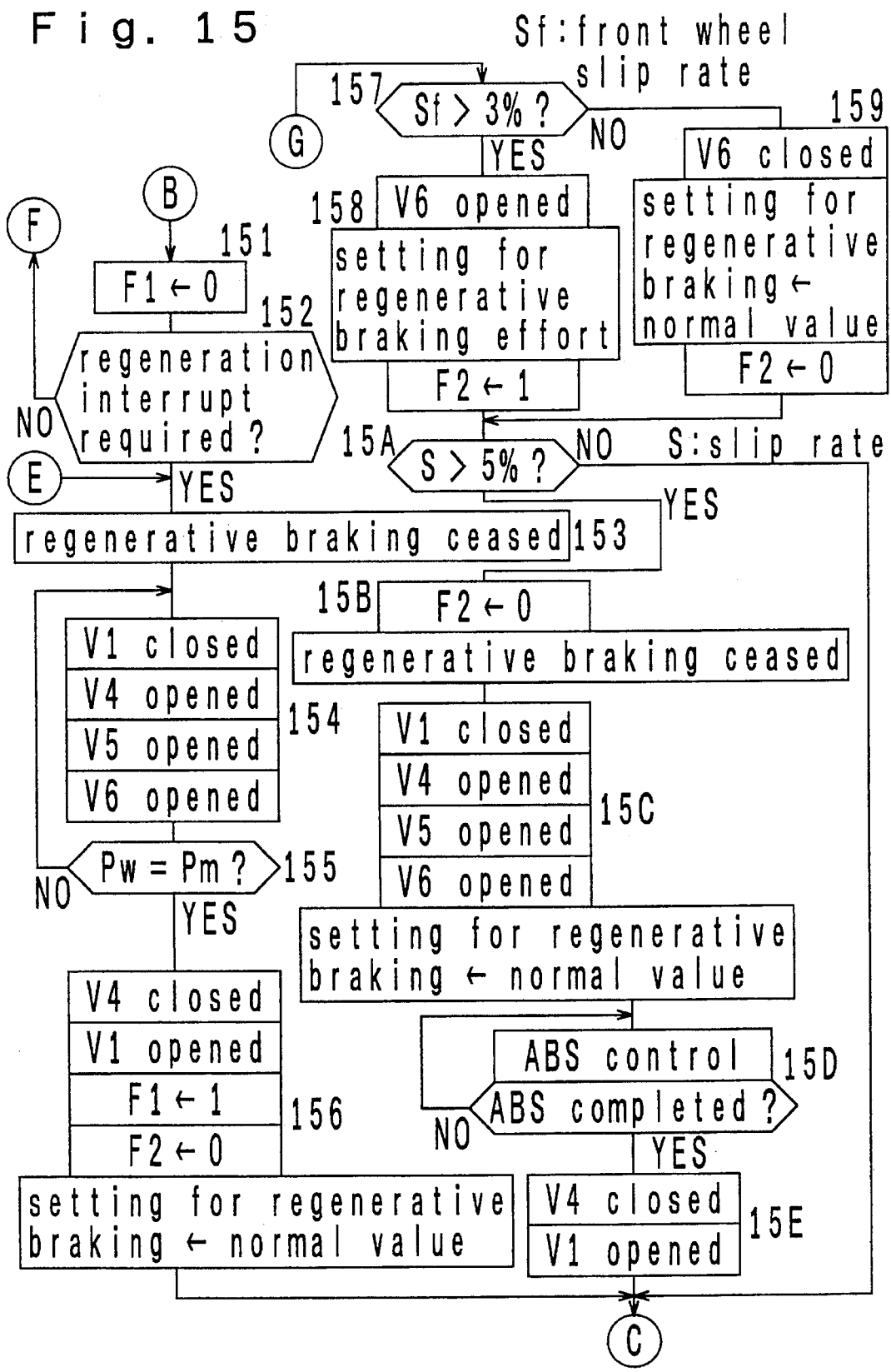
FIG. 15 is a flow chart also showing part of the operation of the microcomputer CPU 2 shown in FIG. 4.

The major operation performed by the microcomputer CPU2 in the brake controller ECUB shown in FIG. 4 is illustrated in FIGS. 14 and 15. The operation of the microcomputer CPU2 will be described below initially with reference to FIG. 14.

When the power supply is turned on, an initialization is executed at step 141. Specifically, an operation check of the microcomputer CPU2 itself and an initialization of various modes are executed, followed by a system initialization. At this time, the solenoid valves V1, V2, V3, V4, V5, V6, V7, V8, V9, V10, V11, V12, V13 and V14 are set up in their "open", "open", "closed", "closed", "open", "open", "open", "closed", "open", "closed", "open", "closed", "open" and "closed" conditions, respectively.

At next step 142, the system remains in its standby condition as long as a start switch remains off, this switch corresponding to an ignition switch usually provided on an automobile. In response to the turn-on of the start switch, the detection of motor condition, the detection of battery condition, the detection of condition of transmission, a decision concerning the necessity of a regenerative braking, the detection of M/C pressure Pm, and the detection of W/C pressure Pw are executed at step 14Y. At next step 14X, a decision is made to see if a traction control is required. When the traction control is found unnecessary, the operation proceeds to step 143 where the number of revolutions (rpm) of the motor M1 which is detected by the motor speed sensor MS is compared against a given threshold R0. In the present embodiment, when the number of revolutions is equal to or less than 400 rpm, the operation proceeds to step 144; otherwise, the operation proceeds to step 149.

At step 144, a reference is made to an output from the pressure sensor PS1 to see if the detected pressure is or is not equal to 0, or if there is no depression of the brake pedal. In the absence of depression of the brake pedal, the operation then proceeds to step 145, and otherwise, the operation proceeds to step 146.

At step 145, the solenoid valves V5 and V6, which are bypass valves, are both opened. This allows the port PL of the booster HB and the wheel cylinder WC4 to communicate through the solenoid valves V1, V5 and V7, and also allows the port PL to communicate with the wheel cylinder WC3 through the solenoid valves V1, V5 and V9. Also a communication between the port PH of the booster HB and the wheel cylinder WC2 through the solenoid valves V2 and V6, the proportioning valve VP and the solenoid valve V11 is allowed as is the communication between the port PH and the wheel cylinder WC1 through the solenoid valves V2 and V6, the proportioning valve VP and the solenoid valve V13.

When the brake pedal is depressed, the solenoid valve V1 is closed while the solenoid valves V4, V5 and V6 are opened at step 146. Accordingly, the dynamic pressure which is delivered from the port PH of the booster HB is applied to the wheel cylinder WC4 through the solenoid valves V2, V4, V5 and V7, also applied to the wheel cylinder WC3 through the solenoid valves V2, V4, V5 and V9, similarly applied to the wheel cylinder WC2 through the solenoid valves V2 and V6, the proportioning valve VP and the solenoid valve V11, and finally applied to the wheel cylinder WC1 through the solenoid valves V2 and V6, the proportioning valve VP and the solenoid valve V13.

Figure 7:
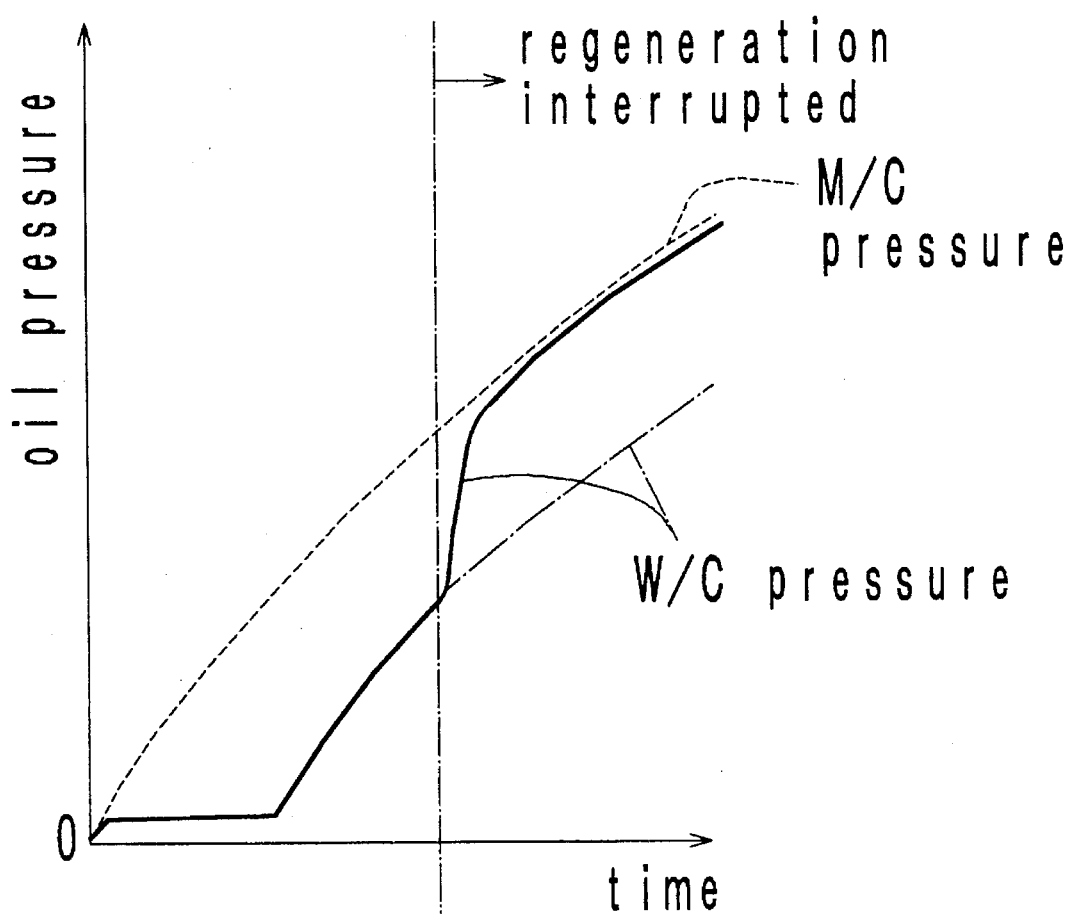
FIG. 7 graphically shows a change in the M/C pressure and W/C pressure with time which is obtained by the embodiment of the invention.

When the solenoid valve V5, which is a bypass valve, is closed, the presence of the relief valve VR2 produces a pressure differential across its opposite ends, namely, or a difference between the master cylinder pressure and the wheel cylinder pressure. Accordingly, if the solenoid valve V5 is switched from its closed to its open condition, the oil in the master cylinder (which is the booster HB in the present example) at once flows into the wheel cylinders WC3 and WC4. Accordingly, when the static pressure at the port PL is supplied as the master cylinder pressure, there occurs a temporary depression in the static pressure, and consequently a sinking of the brake pedal. However, in the present embodiment, the solenoid valve V1 is closed to interrupt the oil supply from the port PL, and instead the dynamic pressure from the port PH is supplied to the wheel cylinders WC3 and WC4 through the solenoid valves V2 and V4, thus preventing a depression in the static pressure, and a consequent sinking of the brake pedal from occurring. As mentioned previously, the dynamic pressure delivered from the hydraulic booster HB is automatically adjusted so that it matches the static pressure. As a consequence, when there is no depression in the static pressure, no depression occurs in the dynamic pressure, thereby allowing the wheel cylinder pressure (W/C pressure) to rise to the master cylinder pressure (M/C pressure; which is the pressure at the port PL in the present example) within a brief time interval as indicated in FIG. 7.

At step 147, a wheel cylinder pressure Pw detected by the pressure sensor PS2 and the master cylinder pressure Pm detected by the pressure sensor PS1 are entered, and the operation remains in the standby mode until such pressures match. When Pw=Pm is found, the operation proceeds to step 148 where the solenoid valve V4 is closed while the solenoid valve V1 is opened. Consequently, the static pressure from the port PL is supplied to the wheel cylinders WC3 and WC4.

On the other hand, when the number of revolutions of the motor M1 is equal to or above 400 rpm, a regeneration inhibit flag F1 is examined initially at step 149. If F1=0, meaning that the regenerative braking is not inhibited, the operation proceeds to step 14A. On the other hand, if F1=1, indicating that the regenerative braking is inhibited, the operation proceeds to step 14Z. At step 14A, a regeneration reduce flag F2 is examined, and if F2=0, meaning that a reduction in the regenerative braking is not required, the operation proceeds to step 14B. Otherwise or if F2=1, the operation proceeds to step 174 shown in FIG. 17.

At step 14B, the solenoid valves V5 and V6, which are bypass valves, are both closed. When the solenoid valve V5 is closed, a pressure differential having a magnitude determined by the relief valve VR2 is produced between the master cylinder pressure (or the pressure at the port PL) and the pressure of the wheel cylinders WC3 and WC4. Accordingly, the oil pressure braking effort associated with the front wheels and which are produced by the wheel cylinders WC3 and WC4 will be reduced by an amount corresponding to the pressure differential created by the relief valve VR2 than usual. Similarly, when the solenoid valve V6 is closed, a pressure differential having a magnitude determined by the relief valve VR1 is produced between the master cylinder pressure (or the pressure at the port PH) and the pressure of the wheel cylinders WC1 and WC2. Again, the oil pressure braking effort associated with rear wheels and which are produced by the wheel cylinders WC1 and WC2 will be reduced by an amount corresponding to the pressure differential created by the relief valve VR1 than usual. However, when the oil pressure braking effort is reduced in this manner, the regenerative braking effort of the motor M1 is applied to the wheels WFL and WFR, thus compensating for a reduction in the oil pressure braking effort and assuring a sufficient braking effort as a whole.

At step 14Z, the brake is examined if it is off. If it is off, the operation proceeds to step 14C, and if it is on, the operation proceeds to step 151 shown in FIG. 15.

At step 14C, an examination is initially made to see if a regenerative braking is impossible. This is accomplished by seeing if the requirements to perform a regenerative braking are satisfied, on the basis of information including the presence or absence of a failure of the motor M1, the current number of revolutions (rpm) of the motor M1, the temperature, the voltage and the current of the motor M1, information relating to the inverter, the presence or absence of a failure in the battery 1, the degree of discharge of the battery 1, the temperature of the battery 1 and the status of the transmission TM (shift position). The detection of such information is executed at step 14Y mentioned above, and a decision to see if the requirements are met is executed at step 14C. In the present embodiment, "regenerative braking enabled" is issued when all the following requirements are satisfied.

a. Neither motor nor inverter experiences a failure;

b. The both voltages of the motor and the inverter are within a normal range;

c. The currents of the motor and the inverter are in a normal range;

d. The temperatures of the motor and the inverter are in a given range which enables a normal operation;

e. The number of revolution of the motor is in a range which is guaranteed by the shaft, bearings and gears;

f. The battery voltage is in a given range (namely, having a sufficient voltage level to operate the motor and the inverter in a normal manner);

g. The battery current is within a permissible range;

h. The degree of discharge of the battery is within a rechargeable range;

i. The battery temperature is in a range which assures a normal operation; and j. The transmission assumes a shift position other than a backward and a neutral position.

If it is found that the regenerative braking is impossible, the operation proceeds to step 14D, but otherwise, the operation returns to step 142.

At step 14D, the solenoid valves V5 and V6, which are bypass valves, are opened, removing the pressure differential between the master cylinder pressure and the wheel cylinder pressures, thus terminating a reduction in the oil pressure braking effort. At next step 14E, the regeneration inhibit flag F1 is set to "1" (inhibiting the regenerative braking).

Continuing the description with reference to FIG. 15, when the brake is on, the operation proceeds to step 151 where the regeneration inhibit flag F1 is cleared, followed by proceeding to step 152.

At step 152, a decision to see if the requirements are met is executed in the same manner as at step 14C, examining if the regenerative braking is impossible. If "regenerative braking enabled" is not found, or when conditions which inhibit the regenerative braking operation are found as a result of a failure which took place during the regenerative braking operation, this is considered as "regeneration interrupt required" being declared, and the operation proceeds to step 153. If the result of the decision at step 152 is "regenerative braking enabled", the operation proceeds to step 176 shown in FIG. 17.

At step 153, a command to interrupt the regenerative braking is delivered to the motor controller ECUM. At step 154, the solenoid valve V1 is closed while the solenoid valves V4, V5 and V6 are opened. Accordingly, the dynamic pressure delivered from the port PH of the hydraulic booster HB is applied to the wheel cylinder WC4 through the solenoid valves V2, V4, V5 and V7, applied to the wheel cylinder WC3 through the solenoid valves V2, V4, V5 and V9, applied to the wheel cylinder WC2 through the solenoid valves V2 and V6, the proportioning valve VP and the solenoid valve V1, and finally applied to the wheel cylinder WC1 through thee solenoid valves V2 and V6, the proportioning valve VP and the solenoid valve V3.

When the solenoid valve V5, for example, which is a bypass valve, is closed, the relief valve VR2 produces a pressure differential across its opposite ends (namely, between the master cylinder pressure and the wheel cylinder pressure). Accordingly, if the solenoid valve V5 is switched from its closed to its open condition, the oil from the master cylinder (which is the booster HB in the present example) at once flows into the wheel cylinders WC3 and WC4. Accordingly, when the static pressure from the port PL is supplied as the master cylinder pressure, there occurs a temporary depression in the static pressure, and the consequent sinking of the brake pedal. However, in the present embodiment, the solenoid valve V1 is closed to interrupt the oil supply from the port PL, and instead the dynamic pressure from the port PH is supplied to the wheel cylinders WC3 and WC4 through the solenoid valves V2 and V4, thus preventing a depression in the static pressure, and consequently a sinking of the brake pedal from occurring. As mentioned previously, the dynamic pressure delivered from the hydraulic booster HB is automatically adjusted so that it matches the static pressure, and hence, when there is no depression in the static pressure, no depression can occur in the dynamic pressure, allowing the wheel cylinder pressure (W/C pressure) to rise to the master cylinder pressure (M/C pressure: which is the pressure at the port PL in the present example) within a brief time interval as shown in FIG. 7.

At step 155, the wheel cylinder pressure Pw detected by the pressure sensor PS2 and the master cylinder pressure Pm detected by the pressure sensor PS1 are entered, and the operation remains in its standby mode until these pressures match. Upon Pw=Pm, the operation proceeds to next step 156 where the solenoid valve V4 is closed while the solenoid valve V1 is opened, the regeneration inhibit flag F1 is set to "1", the flag F2 is cleared, and a normal value is loaded as a setting for the regenerative braking effort. Accordingly, the static pressure from the port PL is again supplied to the wheel cylinders WC3 and WC4.

Figure 10:
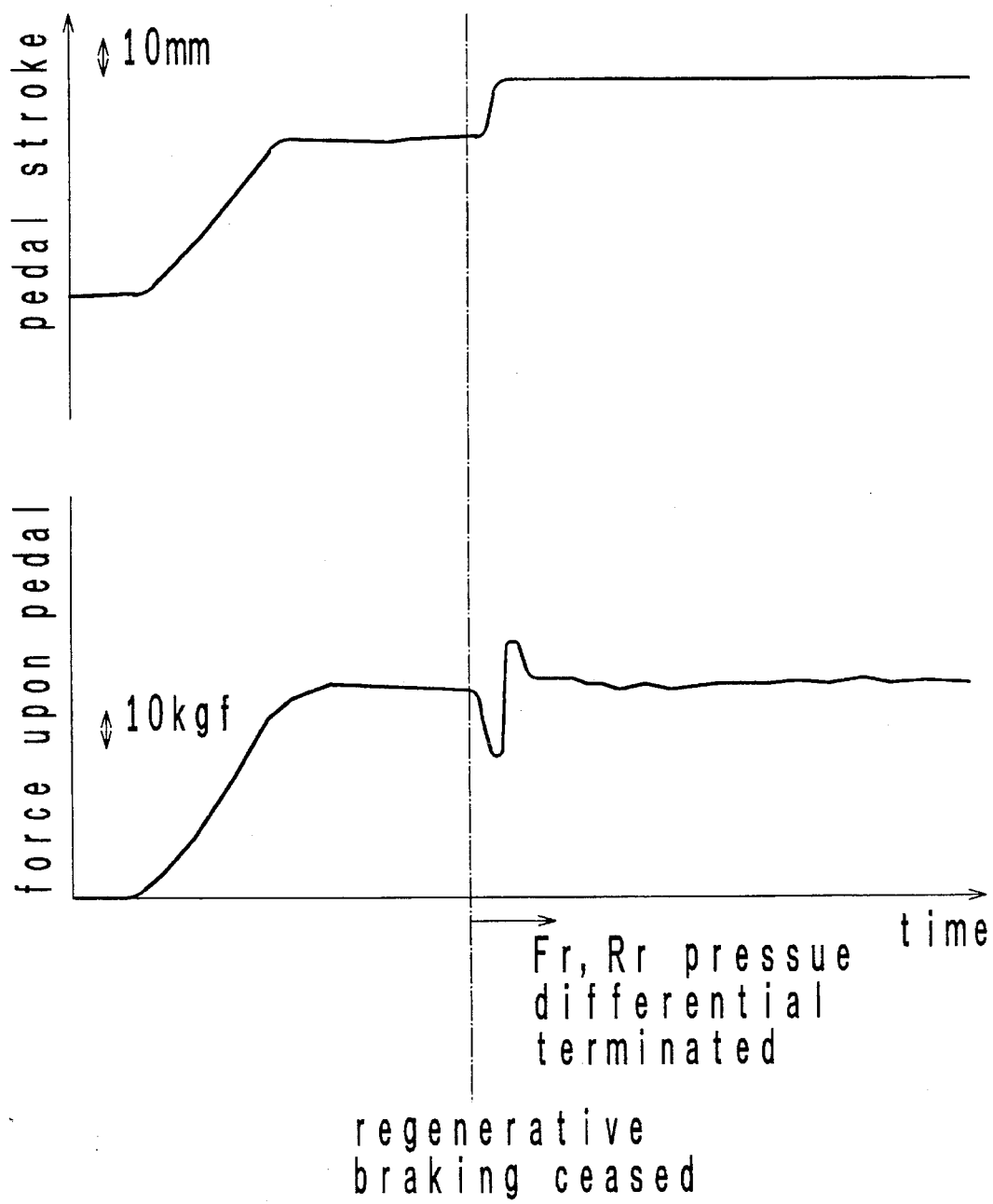
FIG. 10 graphically shows a change in the pedal stroke and the force of pedal depression upon terminating the regeneration preferential mode in a control which is used for comparison against FIG. 11.
Figure 11:
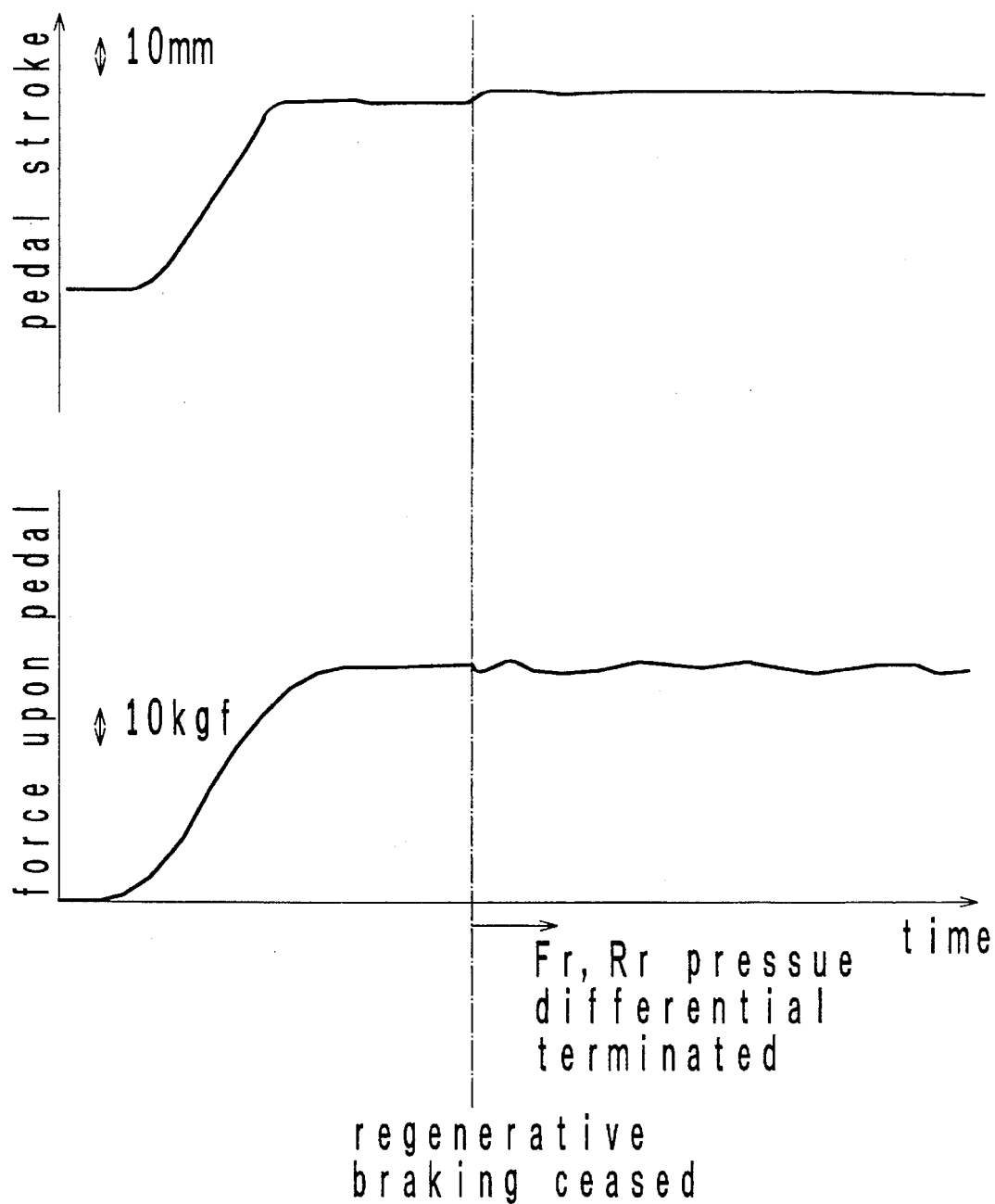
FIG. 11 graphically shows a change in the pedal stroke and the force of pedal depression upon terminating the regeneration preferential mode in the embodiment of the invention.

Changes occurring in the stroke of the brake pedal and the force depressing the pedal with time when the steps 154, 155 and 156 of the present embodiment are executed are graphically illustrated in FIG. 11. As a control, a corresponding change when the solenoid valve V4 is closed while the solenoid valve V1 remains open is graphically shown in FIG. 10.

Figure 8:
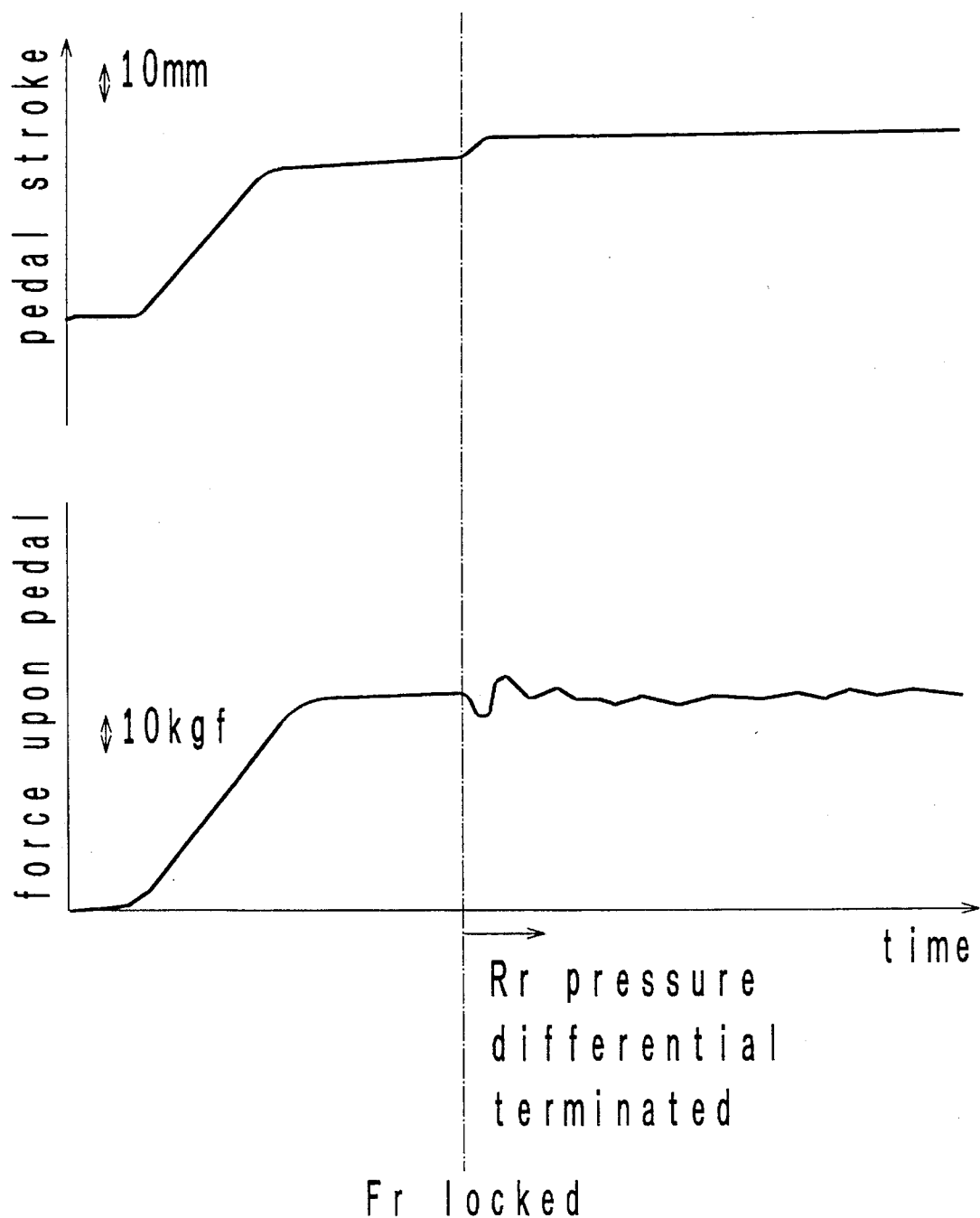
FIG. 8 graphically shows a change in the pedal stroke and the force of pedal depression with time when terminating a regeneration preferential mode in a control which is used for comparison with FIG. 9.
Figure 9:
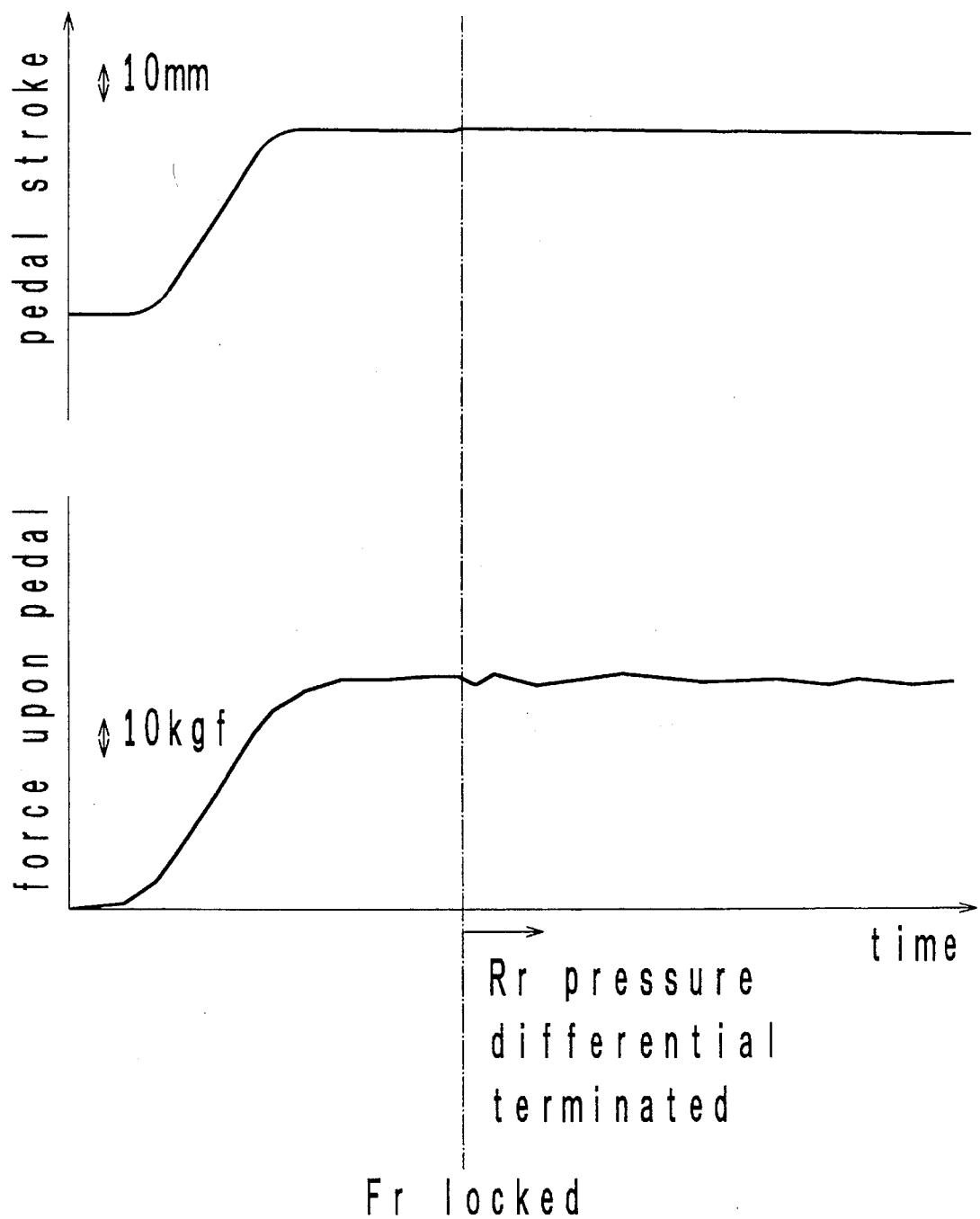
FIG. 9 graphically shows a change in the pedal stroke and the force of pedal depression with time upon terminating the regeneration preferential mode in a modification of the embodiment.

Similarly, a change in the stroke of the brake pedal and the brake depressing force with time when the solenoid valve V5 is left closed while the solenoid valve V6 is opened at step 154 is graphically shown in FIG. 9. Finally, a change in a stroke of the brake pedal and the brake depression force with time when the solenoid valve V4 is closed while the solenoid valve V1 is left open, and when the solenoid valve V5 is closed while the solenoid valve V6 is opened at step 154 is graphically shown in FIG. 8.

It will be evident from the comparison of FIG. 11 against FIG. 10 and FIG. 9 against FIG. 8 that a rapid change in the stroke of the brake pedal and an unstable change (excursion) in the pedal depressing force can be drastically suppressed when removing the pressure differentials across the relief valves VR2, VR1 by opening the bypass valves V5, V6, by interrupting the supply of the static pressure (the oil pressure from the port PL) and instead supplying the dynamic pressure (the oil pressure from the port PH) to the wheel cylinders WC1 to WC4 as in the present embodiment.

In the present embodiment, the relief valve VR2, VR1 and the bypass valve V5, V6 are disposed in each of the oil pressure systems associated with the front and the rear wheel, but when the relief valve and the bypass valve are disposed in one of the oil pressure system associated with either the front or the rear wheel, the dynamic pressure may be temporarily supplied to the wheel cylinder when the bypass valve is opened to terminate the pressure differential across the relief valve, thereby substantially suppressing a rapid change in the stroke of the brake pedal and an unstable change, (excursion) of the pedal depressing force as illustrated in FIG. 9.

At step 157, a slip rate Sf of the front wheel (WFL, WFR) is obtained, and compared against a threshold value (3%). The slip rate Sf is defined as follows:

$$SF = (vehicle\ speed - rotational\ speed\ of\ the\ front\ wheel)/vehicle\ speed$$

In the present embodiment, the rotational speed of the front wheel is derived as an average value of the wheel speed of the front, left wheel WFL detected by the wheel speed sensor PS3 and the wheel speed of the front, right wheel WFR detected by the wheel speed sensor PS4. The vehicle speed is determined as an average value of the four wheel speeds detected by the wheel speed sensors TS1 to TS4, which is smoothed against the time axis.

If SF >3%, indicating that the front wheel is likely to lock, the operation proceeds to step 158. Otherwise, the operation proceeds to step 159.

At step 158, the solenoid valve V6 is opened to terminate the pressure differential across the relief valve VR1, thereby increasing the oil pressure braking effort applied to the rear wheel (WRL, WRR). Simultaneously, a signal is fed to the motor controller ECUM so as to reduce the regenerative braking effort associated with the front wheel (WFL, WFR). Also, the regeneration reducing flag F2 is set to "1".

Figure 16:
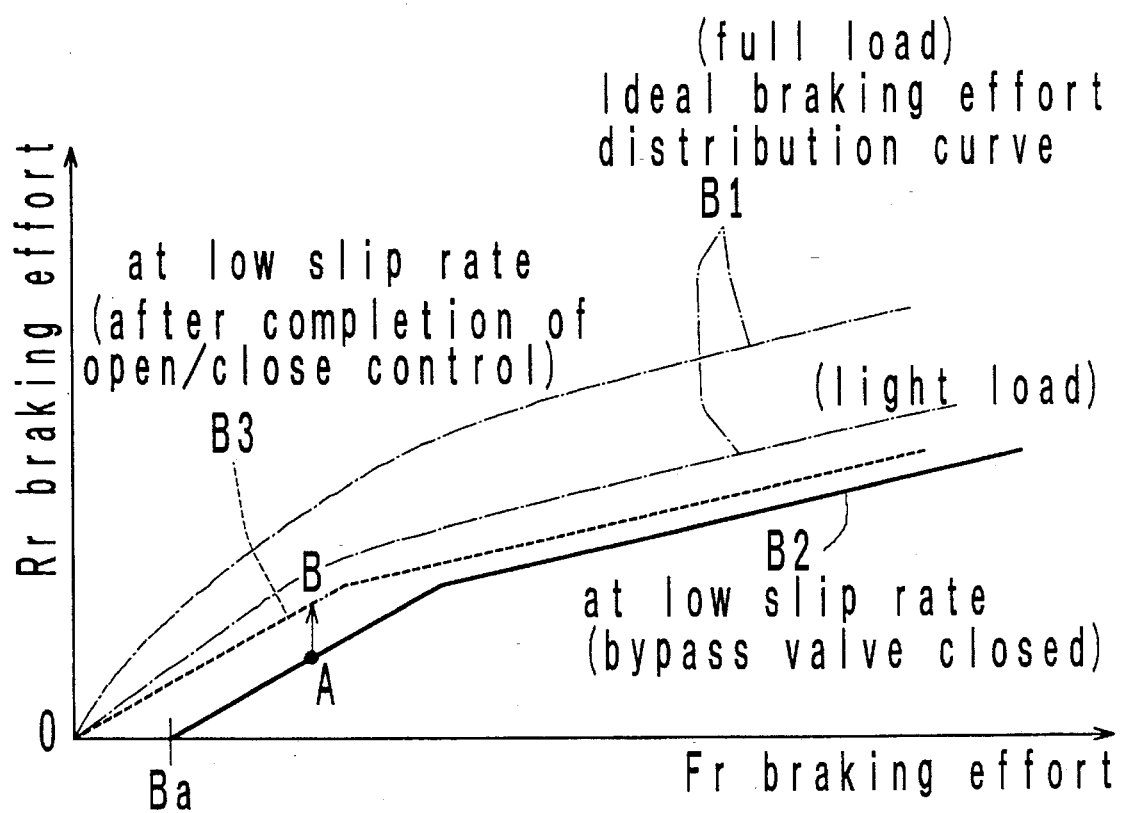
FIG. 16 graphically shows a distribution of the braking effort for a front wheel (Fr) and a rear wheel (Rr)

Normally, the braking effort on the front wheels to which the regenerative braking can be applied is predominant for effective utilization of power, and accordingly, the braking effort for the front wheel is chosen to be greater than that of the rear wheel, as indicated by curve B2 shown in solid line in FIG. 16. However, when the front wheel is likely to lock, this means that there is a high possibility that the entire braking effort is wanting, and accordingly, the pressure differential across the relief valve VR1 in the oil pressure system associated with the rear wheels is terminated, thus increasing the oil pressure braking effort applied to the rear wheels. In addition, the regenerative braking effort of the front wheels is reduced in order to avoid a locking of the front wheels.

When the slip rate of the front wheel is small, the solenoid valve V6 is closed at step 159, a signal is fed to the motor controller ECUM so that a normal regenerative braking effort is produced, and the regeneration reducing flag F2 is cleared.

At step 15A, a slip rate S is obtained and compared against the threshold value of 5%. The slip rate S refers to the slip rate of each of the four wheels, and is defined as follows:

*S=(vehicle speed–rotational speed of each wheel)/vehicle speed*

When the slip rate S of either one of the wheels exceeds 5%, the operation proceeds to step 15B where the regeneration reducing flag F2 is cleared, and a command is transmitted to the motor controller ECUM to interrupt the regenerative braking operation.

At subsequent step 15C, the solenoid valve V1 is closed while the solenoid valves V4, V5 and V6 are opened. Accordingly, the dynamic pressure delivered from the port PH of the hydraulic booster HB is applied to the wheel cylinder WC4 through the solenoid valves V2, V4, V5 and V7, applied to the wheel cylinder WC3 through the solenoid valves V2, V4, V5 and V9, applied to the wheel cylinder WC2 through the solenoid valves V2 and V6, the proportioning valve VP and the solenoid valve V11, and applied to the wheel cylinder WC1 through the solenoid valves V2 and V6, the proportioning valve VP and the solenoid valve V13. A normal value for the regenerative braking effort is transmitted to the motor controller ECUM.

As a consequence, when proceeding to the subsequent step 15D, all of the wheel cylinders WC1 to WC4 associated with the front and the rear wheel are being driven by the dynamic pressure delivered from the port PH of the hydraulic booster HB. At step 15D, a control which is similar to ABS (anti-lock brake system), which is known in the art, is performed until a given condition is satisfied (for example, until the slip rate S of each wheel is reduced). Specifically, an intensification and a decompression is alternately repeated for each of the wheel cylinders WC1 to WC4.

When the wheel cylinder WC1 is intensified, the solenoid valve V13 is opened while the solenoid valve V14 remains closed. When this cylinder is decompressed, the solenoid valve V14 is opened while the solenoid valve V13 is closed. Similarly, when the wheel cylinder WC2 is intensified, the solenoid valve V12 is left closed while the solenoid valve V11 is opened, and when it is decompressed, the solenoid valve V11 remains closed while the solenoid valve V12 is opened. When the wheel cylinder WC3 is intensified, the solenoid valve V9 is opened while the solenoid valve V10 remains closed, and when it is decompressed, the solenoid valve V10 is opened while the solenoid valve V9 remains closed. Finally, when the wheel cylinder WC4 is intensified, the solenoid valve V7 is opened while the solenoid valve V8 remains closed, and when it is decompressed, the solenoid valve V8 is opened while the solenoid valve V7 remains closed.

Upon completion of the ABS control, the operation proceeds to step 15E where the solenoid valve V14 is closed while the solenoid valve V1 is opened. Accordingly, the static pressure is again supplied to the wheel cylinders WC3, WC4 associated with the front wheels.

Figure 12:
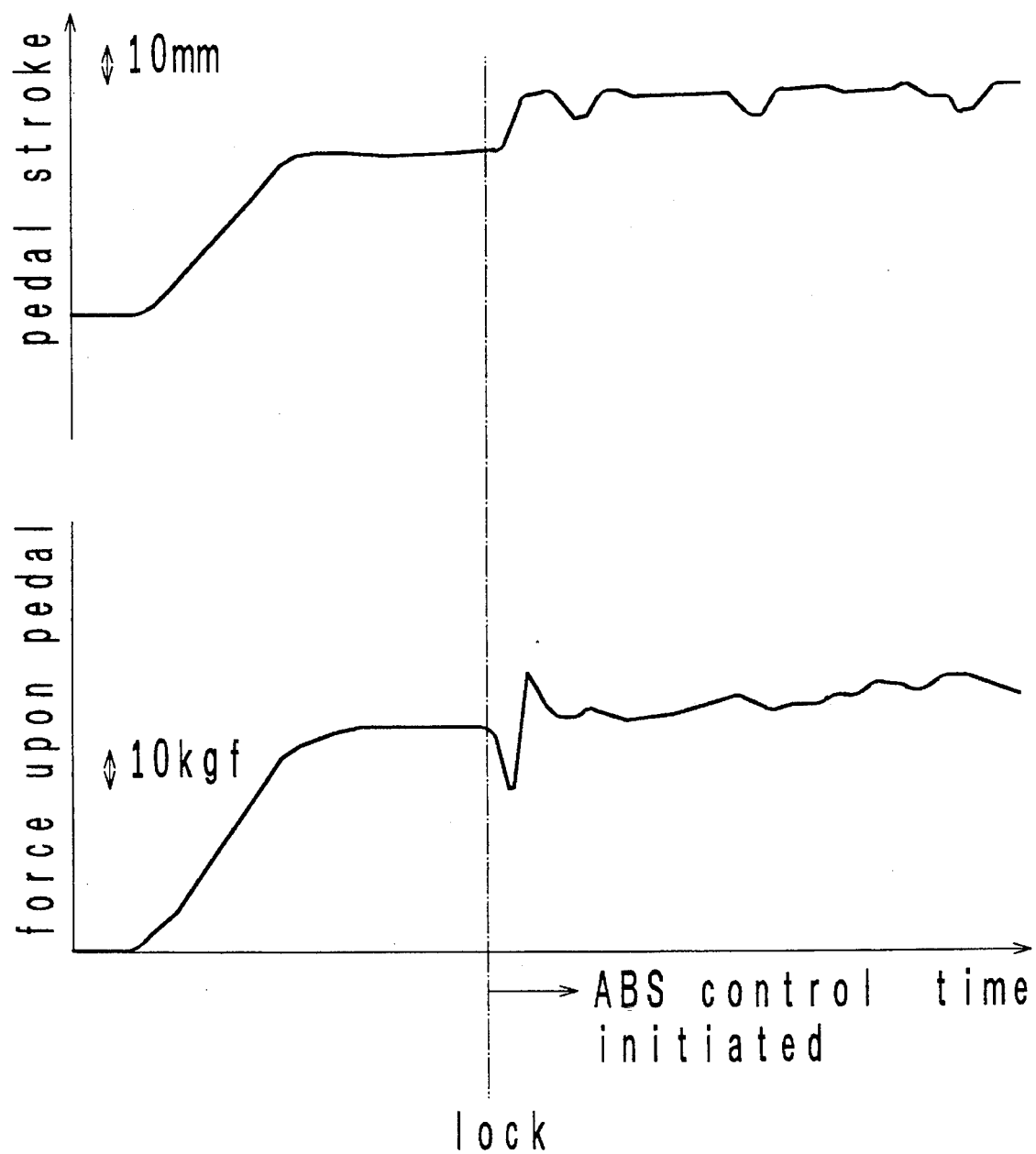
FIG. 12 graphically shows a change in the pedal stroke and the force of pedal depression when conducting an ABS control in a control which is used for comparison against FIG. 13.
Figure 13:
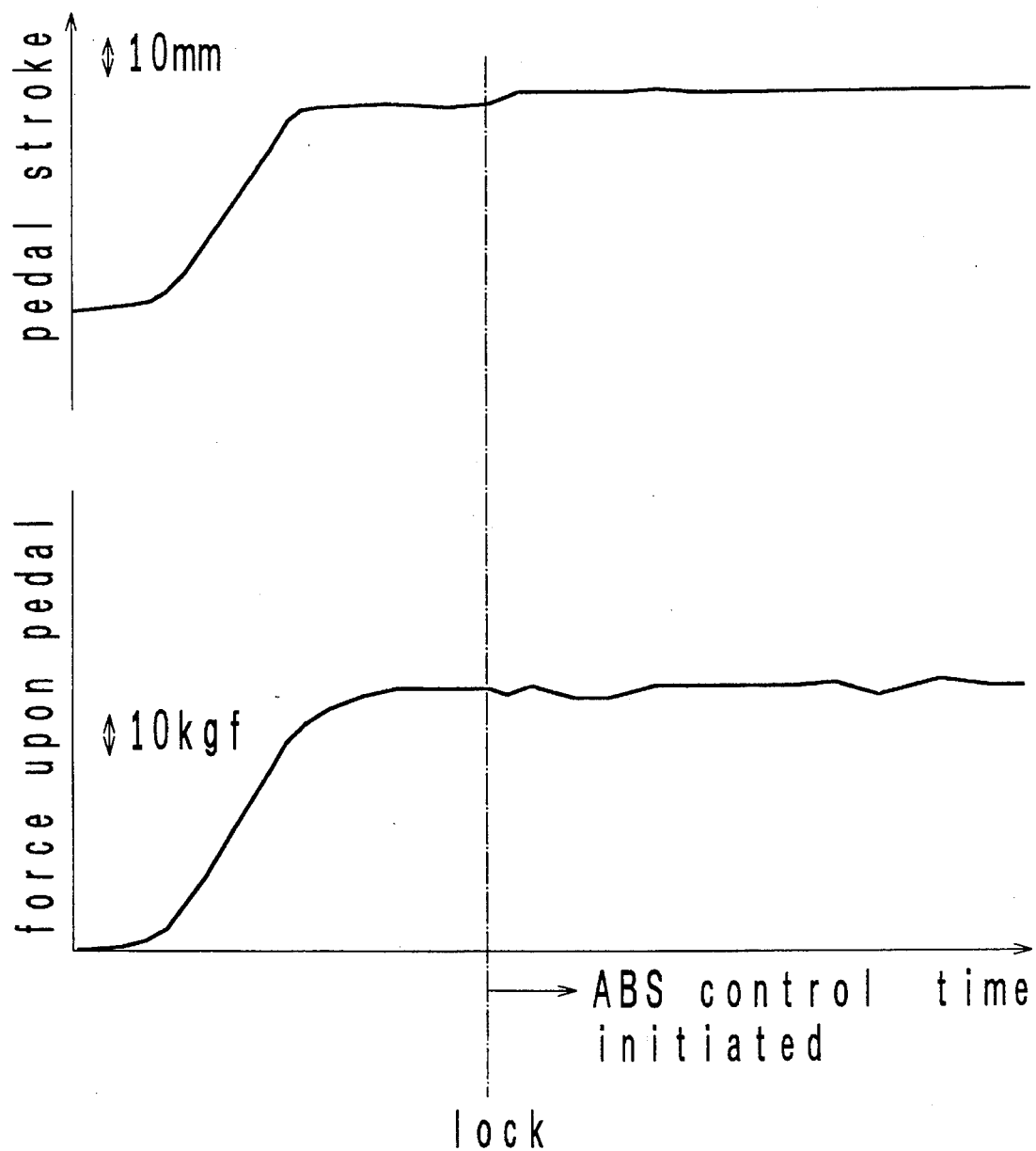
FIG. 13 graphically shows a change in the pedal stroke and the .force of pedal depression with time when conducting an ABS control in the embodiment of the invention.

An example of a change in the stroke of the brake pedal and the pedal depressing force with time when the ABS control is executed at step 15D is graphically shown in FIG. 13, and as a control, a corresponding change when the solenoid valve V1 is opened and the solenoid valve V4 is closed to supply the static pressure to the wheel cylinders WC3, WC4 associated with the front wheels is graphically shown in FIG. 12. It will be seen from a comparison of FIG. 13 against FIG. 12 that a rapid change in the stroke of the brake pedal and unstable change (excursion) in the pedal depressing force can be drastically suppressed by conducting the ABS control which utilizes the dynamic pressure.

Figure 17:
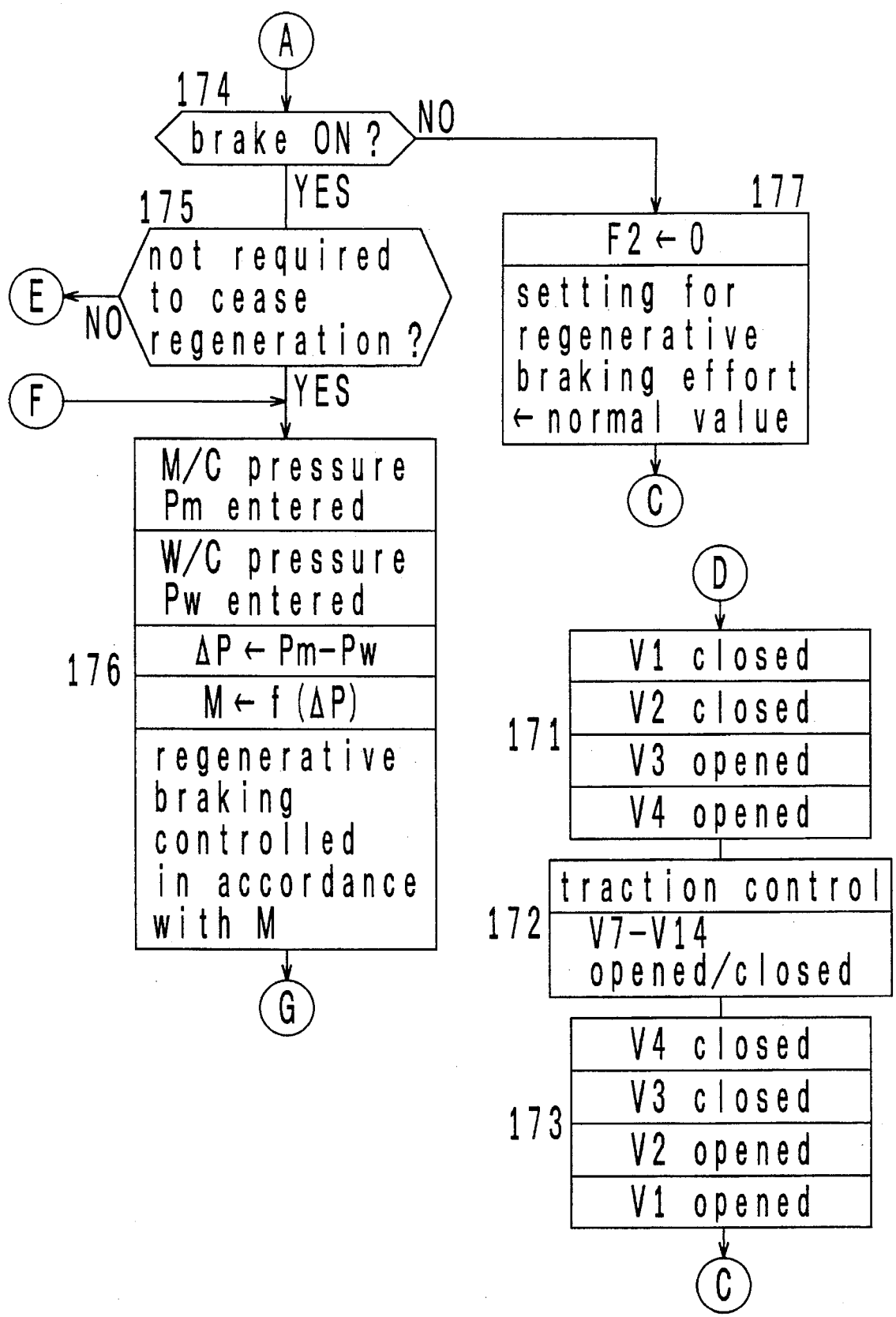
FIG. 17 is a flow chart illustrating part of the operation of the microcomputer CPU 2 shown in FIG. 4.

When the need for a traction control is found to be present at step 14X shown in FIG. 14, the operation proceeds to step 171 shown in FIG. 17. At step 171, the solenoid valve V1 is closed, the solenoid valve V2 is closed, the solenoid valve V3 is opened, and the solenoid valve V4 is opened. Accordingly, the power pressure which has been accumulated in the accumulator ACC is directly supplied to the piping 13 through the solenoid valve V3. Since the solenoid valve V4 is open, the power pressure from the piping 13 is applied to the both oil pressure systems associated with the front and the rear wheels. However, since the solenoid valves V1 and V2 are closed, the power pressure from the piping 13 has no influence upon the hydraulic booster HB.

At step 172, a traction control, which is known in the art, is conducted by controlling the valve unit VU. Specifically, the wheel cylinders WC4, WC3, WC2 and WC1 can be intensified by opening the solenoid valves V7, V9, V11 and V13, and can be decompressed by opening the solenoid valves V8, V10, V12 and V14 in the similar manner as mentioned above in connection with the ABS control, thereby suppressing a slip of the wheel which occurs when the driving force is excessively high to prevent a reduction in a magnitude of friction acting between the wheel and the road surface. In this instance, the driving pressure is supplied to the piping 13 without passing through the hydraulic booster HB, and hence there is no need to operate the brake pedal BP.

There is no need to provide the solenoid valve V2 when a traction control is not desired.

At step 173, the solenoid valve V4 is closed, the solenoid valve V3 is closed, the solenoid valve V2 is opened, and the solenoid valve V1 is opened.

At step 174, an examination is made to see if the brake is on or not. If the brake is on, the operation proceeds to step 175, and otherwise, the operation proceeds to step 177. At step 175, an examination is made to see if the interruption of regeneration is unnecessary. If the interruption of regeneration is found unnecessary, the operation proceeds to seep 176, and otherwise, the operation proceeds to step 153 shown in FIG. 15. At step 176, M/C pressure Pm and W/C pressure Pw are entered, and the pressure differential ΔP is derived as Pm−Pw and is used as a parameter to calculate a given function f(ΔP) to obtain M. The magnitude of the regenerative braking is controlled in accordance with this value of M. At step 177, the flag F2 is cleared, and a normal value is set for the setting of the regenerative braking effort.

Figure 18:
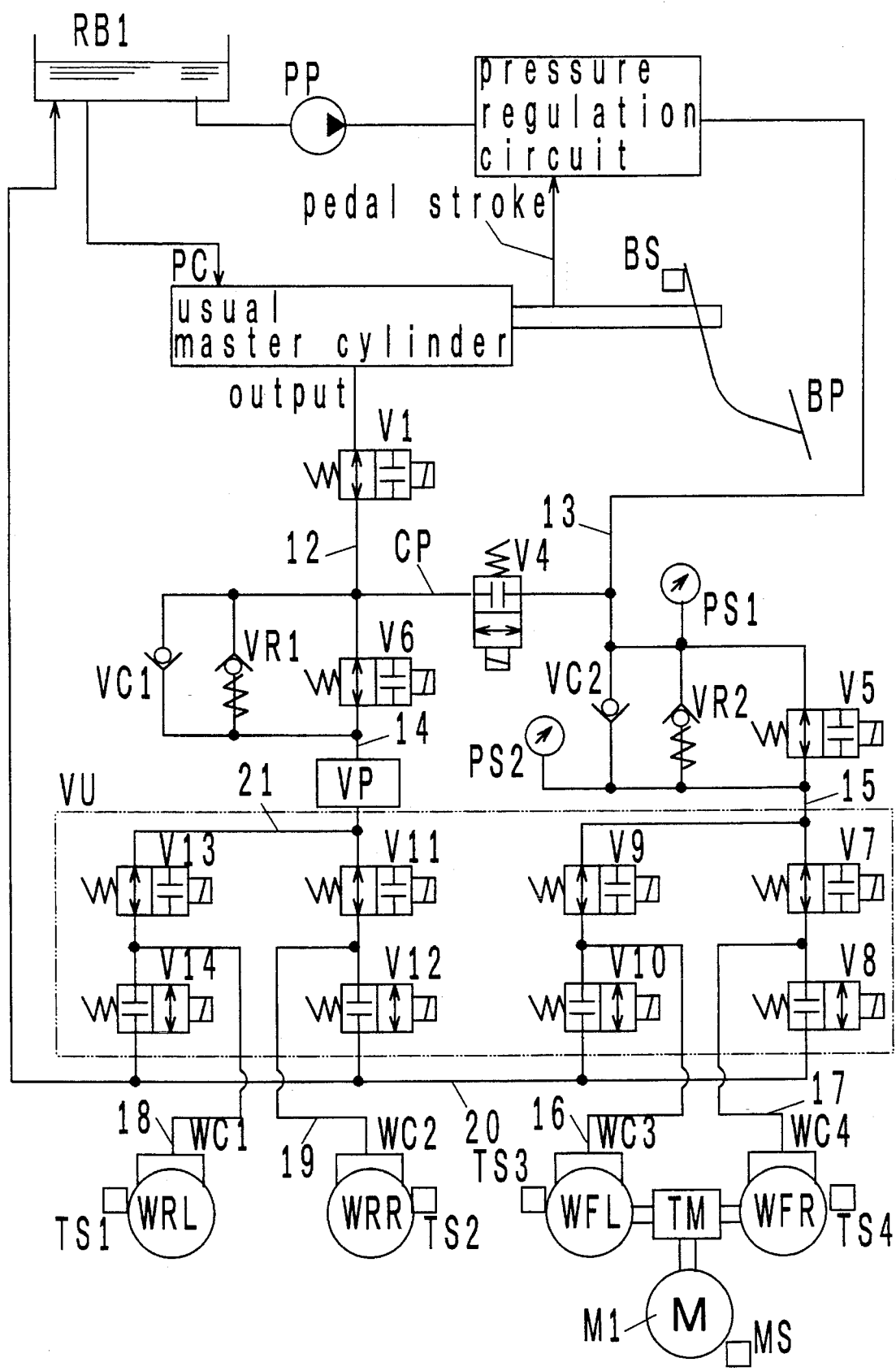
FIG. 18 is a block diagram of a modification of the invention.

In the described embodiment, a master cylinder HB including a hydraulic booster as an integral component thereof has been used so that wheel cylinders may be driven by utilizing a static pressure and a dynamic pressure which are delivered therefrom. However, as shown in FIG. 18, a master cylinder which is constructed in a conventional manner may be combined with a pressure regulation circuit which generates a power pressure.

In addition, a combination of the relief valve VR2 and the solenoid valve V5 which bypasses it, and also a combination of the relief VR1 and the solenoid valve V6 which bypasses it, both shown in FIG. 1, may be replaced by a linear valve which provides an opening in accordance with the energization level.

As described, in accordance with the invention, when the restricting action of the first liquid pressure restricting means and the second liquid pressure restricting means are terminated, the first valve means is cut off while the second valve means is opened, whereby the pressure of the liquid pressure braking means can be raised rapidly, by the power pressure from the second liquid pressure generating means which has no influence upon the stroke of the brake pedal. The use of the power pressure suppresses a depression in the liquid pressure or a change in the stroke of the brake pedal, thus improving a brake feeling.

As mentioned above, in a modification, an anti-lock control of the wheel can be implemented by controlling the braking effort adjusting means.

Similarly, in a further modification, a traction control of the wheel can be implemented by controlling the braking effort adjusting means. This control takes place by utilizing the power pressure, which prevents a change in the stroke of the brake pedal from occurring.

What is claimed is:

1. A control system for motor driven vehicle comprising:

an onboard battery which stores electric energy;

an electric motor fed from the onboard battery for driving at least one of a first and a second wheel;

regenerative braking means for returning electric power generated by the motor to the onboard battery as the first and/or the second driven wheels rotate;

first liquid pressure generating means for generating a braking liquid pressure in response to a depression of a brake pedal;

second liquid pressure generating means for generating a power liquid pressure in accordance with a stroke of the brake pedal, the power liquid pressure being substantially equal in liquid pressure to the braking liquid pressure generated by the first liquid pressure generating means;

first liquid pressure braking means for applying a braking effort which depends on a given liquid pressure to the first wheel;

second liquid pressure braking means for applying a braking effort which depends on a given liquid pressure to the second wheel;

first liquid pressure restricting means interposed in a first liquid flow path extending from the first liquid pressure generating means to the first liquid pressure braking means to apply a restriction upon the liquid pressure supplied to the first liquid pressure braking means;

first restriction terminate means for terminating the restriction upon the liquid pressure applied by the first liquid pressure restricting means;

second liquid pressure restricting means, interposed in a second liquid flow path extending from the second liquid pressure generating means to the second liquid pressure braking means to apply a restriction upon the liquid pressure supplied to the second liquid pressure braking means;

second restriction terminate means for terminating the restriction upon the liquid pressure applied by the second liquid pressure restricting means;

first valve means (V1) interposed in the first liquid flow path between the first liquid pressure generating means and the first liquid pressure restricting means for opening and closing the first liquid flow path;

second valve means (V4) interposed in a third liquid flow path (CP) which connects between the first liquid flow path extending between the first valve means (V1) and the first liquid pressure restricting means and the second liquid flow path extending between the second liquid pressure generating means and the second liquid pressure restricting means;

and switching control means for controlling the first and the second restriction terminate means to terminate the restriction applied by the first and the second liquid pressure restricting means when the regenerative braking means ceases to operate and for closing the first valve means (V1) and opening the second valve means (V4) at least temporarily.

2. A braking system for motor driven vehicle comprising:

an onboard battery for storing electric energy;

an electric motor fed from the onboard battery for driving at least one of a first and a second wheel;

regenerative braking means for returning an electric power generated by the motor to the onboard battery as the first and/or second driven wheels rotate;

a pump for pressurizing a braking liquid;

a master cylinder including a piston disposed for displacing a braking liquid in response to a depression of the braking pedal, a first pressure chamber which is pressurized by the piston, a second pressure chamber, and pressure regulating means for introducing the braking pressure which is pressurized by the pump in accordance with the stroke of the brake pedal into the second pressure chamber so that the pressure in the second pressure chamber is substantially equal to the pressure in the first pressure chamber;

a first wheel cylinder applying a braking effort to the first wheel;

a second wheel cylinder applying a braking effort to the second wheel;

first liquid pressure restricting means interposed in a first liquid flow path extending from the first pressure chamber to the first wheel cylinder to apply a restriction upon the liquid pressure supplied to the first wheel cylinder;

first restriction terminate means connected in parallel with the first liquid pressure restricting means for terminating the restriction upon the liquid pressure applied by the first liquid pressure restricting means;

second liquid pressure restricting means interposed in a second liquid flow path extending from the second pressure chamber to the second wheel cylinder to apply a restriction upon the liquid pressure supplied to the second wheel cylinder;

second restriction terminating valve means for terminating the restriction upon the liquid pressure applied by the second liquid pressure restricting means;

first open/close valve means (V1) interposed in the first liquid flow path extending between the first pressure chamber and the first liquid pressure restricting means for opening or closing the first liquid flow path;

second open/close valve means (V4) interposed in a third liquid flow path (CP) which connects between the first liquid flow path extending between the first open/close valve means (V1) and the first liquid pressure restricting means and the second liquid flow path extending between the second pressure chamber and the second liquid pressure restricting means;

and switching control means for controlling the first and the second restriction terminating valve means to terminate the restriction applied by the first and the second liquid pressure restricting means when the regenerative braking means ceases to operate and for closing the first open/close valve means (V1) and opening the second open/close valve means (V4) at least temporarily.

3. A braking system for motor driven vehicle according to claim 2, including braking effort adjusting means connected in the first liquid flow path extending between the first liquid pressure restricting means and the first wheel cylinder for displacing the braking liquid to a reservoir of the master cylinder to adjust the liquid pressure of the first wheel cylinder.

4. A braking system for motor driven vehicle according to claim 3, further comprising traction control means including third open/close valve means (V3) interposed in a fourth liquid flow path which connects between the second liquid flow path extending between the first open/close valve means and the second liquid pressure restricting means and the output of the pump for opening and closing the liquid flow path, and fourth open/close valve means (V2) interposed in the second liquid flow path extending between the second liquid pressure restricting means and the second pressure chamber for opening and closing the liquid flow path, and the traction control means being operative when a given condition to conduct a traction control is satisfied, to close the first open/close valve means, to open the second open/close valve means, to open the third open/close valve means, and to close the fourth open/close valve means, thereby controlling the braking effort adjusting means to control a braking effort of the wheel.

* * * * *